(12) United States Patent
Lee et al.

(10) Patent No.: US 12,348,844 B2
(45) Date of Patent: Jul. 1, 2025

(54) ELECTRONIC DEVICE INCLUDING STRUCTURE FOR SUPPORTING CAMERA MODULE

(71) Applicant: Samsung Electronics Co., Ltd., Suwon-si (KR)

(72) Inventors: Jungho Lee, Suwon-si (KR); Seungwon Oh, Suwon-si (KR); Jungsik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 18/341,307

(22) Filed: Jun. 26, 2023

(65) Prior Publication Data

US 2024/0114220 A1    Apr. 4, 2024

Related U.S. Application Data

(63) Continuation of application No. PCT/KR2023/008078, filed on Jun. 13, 2023.

(30) Foreign Application Priority Data

Sep. 29, 2022 (KR) .................. 10-2022-0124178
Nov. 15, 2022 (KR) .................. 10-2022-0152597

(51) Int. Cl.
*H04N 23/51* (2023.01)
*G03B 17/56* (2021.01)

(52) U.S. Cl.
CPC .......... *H04N 23/51* (2023.01); *G03B 17/561* (2013.01)

(58) Field of Classification Search
CPC ........ H04N 23/51; H04N 23/45; H04N 23/57; G03B 17/561
See application file for complete search history.

(56) References Cited

U.S. PATENT DOCUMENTS 10,701,250 B2    6/2020   Jarvis et al.
10,963,006 B2    3/2021   Fletcher et al.
(Continued)

FOREIGN PATENT DOCUMENTS

CN    211378109 U    8/2020
CN    114979433 A    8/2022
(Continued)

OTHER PUBLICATIONS

International Search Report and Written Opinion dated Oct. 5, 2023, issued in International Patent Application No. PCT/KR2023/008078.

*Primary Examiner* — Mekonnen D Dagnew
(74) *Attorney, Agent, or Firm* — Jefferson IP Law, LLP

(57) ABSTRACT

An electronic device is provided. The electronic device includes a housing, a first camera module, a second camera module, a camera housing, and a supporting plate coupled to the camera housing, the camera housing includes a first barrier disposed between the first camera module and the second camera module, an accommodating part extending in a direction perpendicular to the supporting plate to surround the first camera module and the second camera module, a first opening exposed to the outside of the housing, and a second opening exposed to the outside of the housing, includes a covering part covering the first camera module and the second camera module, and a supporting member disposed inside the accommodating part to be in contact with at least one of the first camera module and the second camera module, the accommodating part is integrally formed with the covering part.

20 Claims, 8 Drawing Sheets

(56) References Cited

U.S. PATENT DOCUMENTS

| | | |
|---|---|---|
| 11,146,718 B2 | 10/2021 | Ta Van et al. |
| 11,343,416 B2 | 5/2022 | Jo et al. |
| 11,767,012 B2 * | 9/2023 | Song .................. G02B 7/025 |
| | | 701/301 |
| 2019/0163242 A1 * | 5/2019 | Zeng ..................... G06F 1/188 |
| 2019/0166236 A1 * | 5/2019 | Zeng ................ H04M 1/0264 |
| 2021/0281729 A1 * | 9/2021 | Queeney ............. G03B 17/12 |
| 2022/0070347 A1 | 3/2022 | Han |

FOREIGN PATENT DOCUMENTS

| | | |
|---|---|---|
| KR | 10-0845548 B1 | 7/2008 |
| KR | 10-2017-0014944 A | 2/2017 |
| KR | 10-2018-0045275 A | 5/2018 |
| KR | 10-2019-0101545 A | 9/2019 |
| KR | 10-2020-0101240 A | 8/2020 |
| KR | 10-2021-0077102 A | 6/2021 |
| KR | 10-2021-0155598 A | 12/2021 |
| KR | 10-2022-0025227 A | 3/2022 |
| KR | 10-2022-0035902 A | 3/2022 |
| KR | 10-2022-0046820 A | 4/2022 |
| KR | 10-2022-0055855 A | 5/2022 |

* cited by examiner

ELECTRONIC DEVICE INCLUDING STRUCTURE FOR SUPPORTING CAMERA MODULE

CROSS-REFERENCE TO RELATED APPLICATION(S)

This application is a continuation application, claiming priority under § 365(c), of an International application No. PCT/KR2023/008078, filed on Jun. 13, 2023, which is based on and claims the benefit of a Korean patent application number 10-2022-0124178, filed on Sep. 29, 2022, in the Korean Intellectual Property Office, and of a Korean patent application number 10-2022-0152597, filed on Nov. 15, 2022, in the Korean Intellectual Property Office, the disclosure of each of which is incorporated by reference herein in its entirety.

TECHNICAL FIELD

The disclosure relates to an electronic device including a structure for supporting a camera module.

BACKGROUND ART

An electronic device may include a camera for obtaining an image based on receiving light from the outside of the electronic device in order to provide various functions to a user. The camera may be manufactured in the form of a camera module including a printed circuit board before being disposed in the electronic device. The electronic device may include a plurality of camera modules in order to provide various images to the user.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device including a structure for supporting a camera module.

Additional aspects will be set forth in part in the description which follows and, in part, will be apparent from the description, or may be learned by practice of the presented embodiments.

An electronic device is provided. The electronic device includes a housing. According to an embodiment, the electronic device may comprise a first camera module including a first printed circuit board and the first camera disposed on one surface of the first printed circuit board. According to an embodiment, the electronic device may comprise a second camera module including a second printed circuit board and the second camera disposed on one surface of the second printed circuit board. According to an embodiment, the electronic device may comprise a camera housing disposed in the housing and accommodating the first camera module and the second camera module. According to an embodiment, the electronic device may comprise a supporting plate coupled to the camera housing to face the other surface of the first printed circuit board and the other surface of the second printed circuit board. According to an embodiment, the camera housing may include an accommodating part including a first barrier disposed between the first camera module and the second camera module and extending along a direction perpendicular to the supporting plate to surround the first camera module and the second camera module. According to an embodiment, the camera housing may include a covering part including a first opening corresponding the first camera and exposed to outside of the housing and a second opening corresponding the second camera and exposed to outside of the housing, and covering the first camera module and the second camera module by extending along a direction parallel to the supporting plate. According to an embodiment, the camera housing may include a supporting member disposed in the accommodating part to be in contact with at least one of the first camera module and the second camera module. According to an embodiment, the accommodating part is integrally formed with the covering part.

An electronic device is provided. The electronic device includes a display. According to an embodiment, the electronic device may comprise a housing including a first surface supporting the display and a second surface opposite to the first surface. According to an embodiment, the electronic device may comprise a first camera module including a first printed circuit board and the first camera disposed on one surface of the first printed circuit board and facing the second surface. According to an embodiment, the electronic device may comprise a second camera module including a second printed circuit board and the second camera disposed on one surface of the second printed circuit board and facing the second surface. According to an embodiment, the electronic device may comprise a camera housing disposed in the housing and accommodating the first camera module and the second camera module. According to an embodiment, the electronic device may comprise a supporting plate coupled to the camera housing to face the other surface of the first printed circuit board and the other surface of the second printed circuit board. According to an embodiment, the camera housing may include an accommodating part including a first barrier disposed between the first camera module and the second camera module and extending along a direction perpendicular to the one surface of the first printed circuit board to surround the first camera module and the second camera module. According to an embodiment, the camera housing may include a covering part including a first opening exposed to outside of the housing corresponding to the first camera and a second opening exposed to the outside of the housing corresponding to the second camera, and covering the first camera module and the second camera module by extending along a direction parallel to one surface of the first printed circuit board. According to an embodiment, the camera housing may include a supporting member disposed in the accommodating part to be in contact with at least one of the first camera module and the second camera module. According to an embodiment, the covering part may be integrally formed with the accommodating part and may include conductive material configured to shield the first camera module and the second camera module.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms (e.g "a," "an," and "the") include plural referents unless the context clearly dictates otherwise. Thus, for example, reference to "a component surface" includes reference to one or more of such surfaces.

Figure 1:
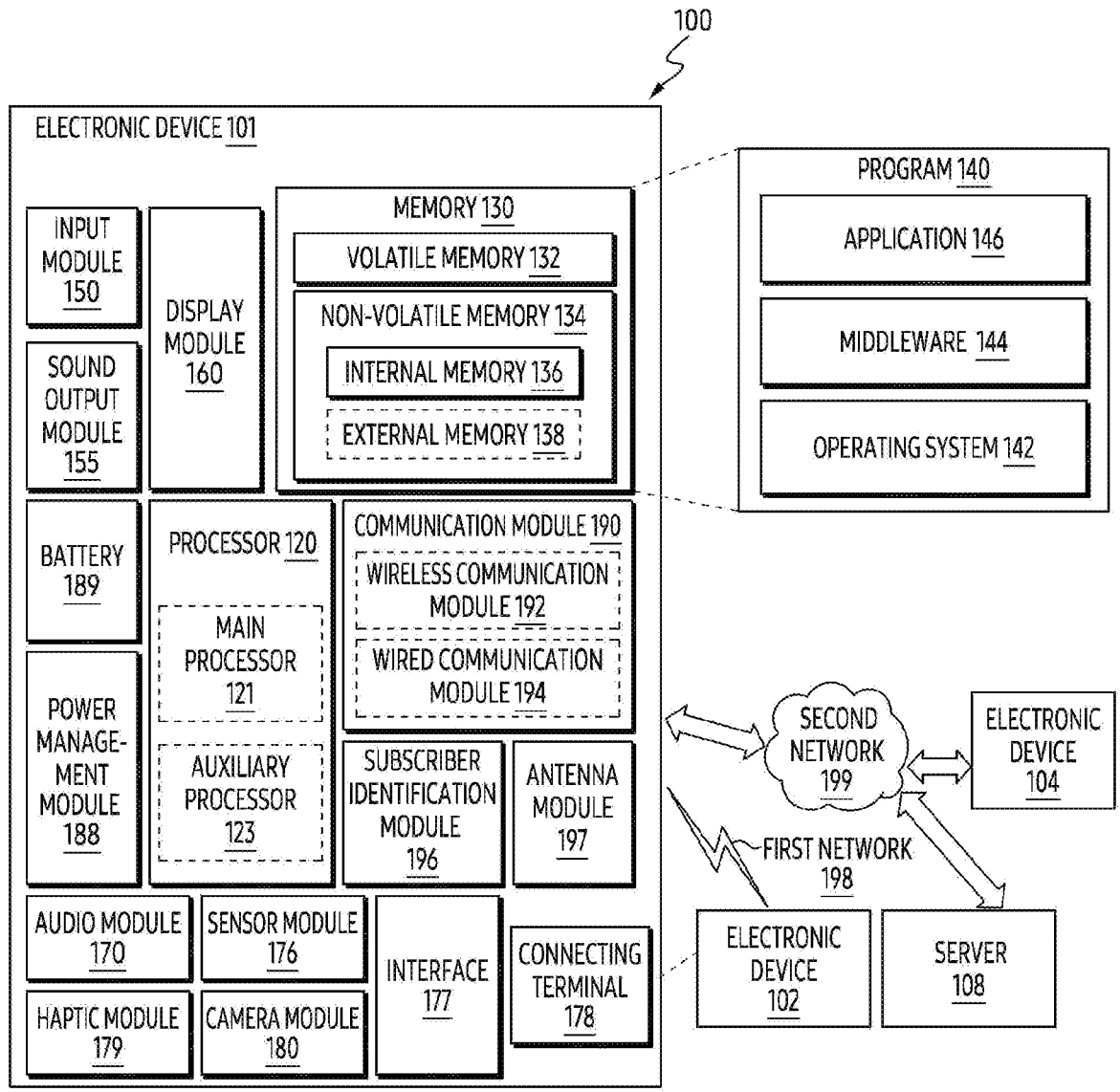
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted-7-oltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
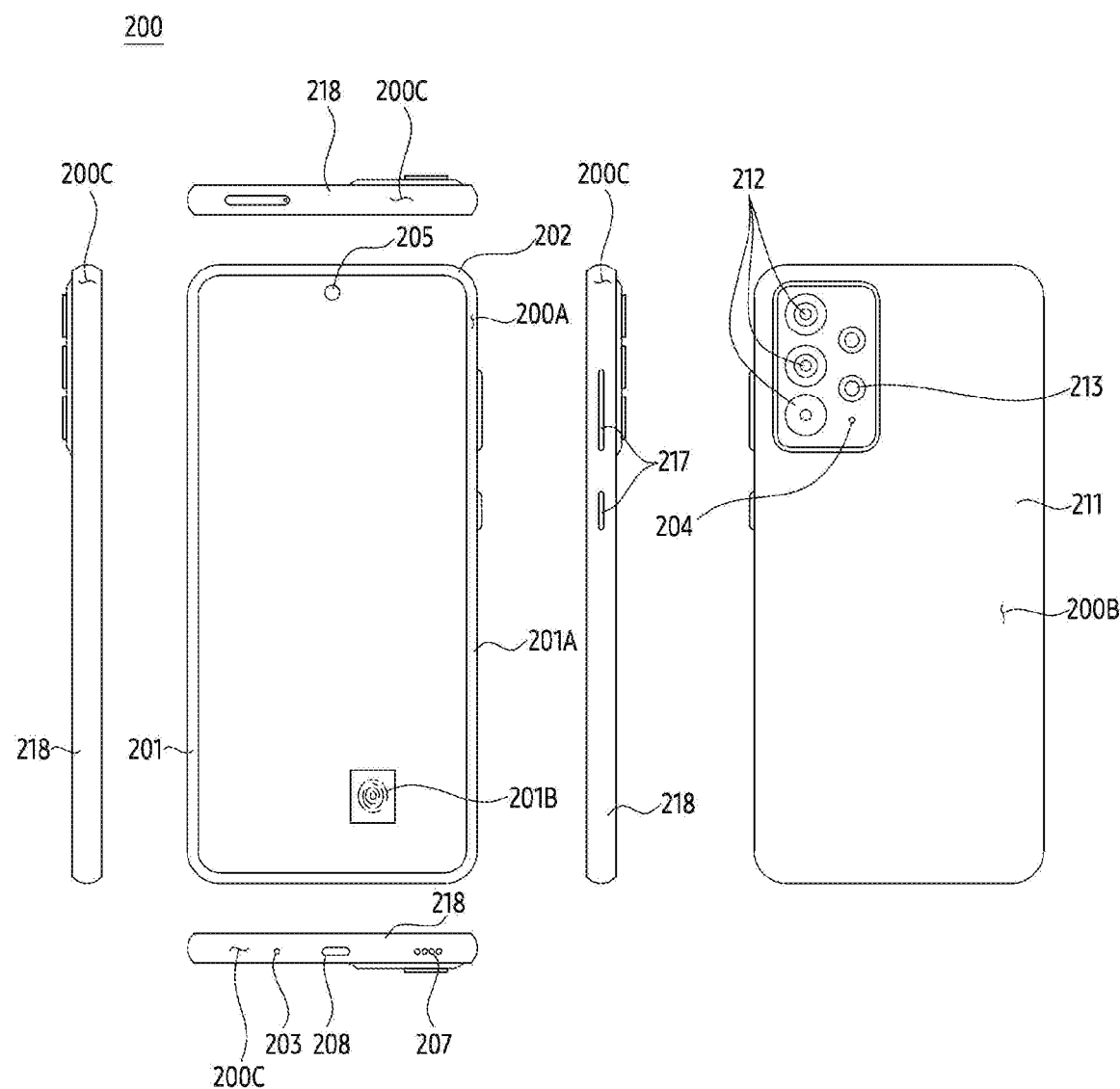
FIG. 2 is a diagram illustrating an exemplary electronic device according to an embodiment.

FIG. 2 is a diagram illustrating an electronic device according to an embodiment.

Referring to FIG. 2, an electronic device 200 according to an embodiment may include a housing forming an appearance of the electronic device 200. For example, the housing includes a first surface (or front surface) 200A, a second surface (or rear surface) 200B, and a third surface (or side surface) 200C surrounding a space between the first surface 200A and the second surface 200B. In an embodiment, the housing may refer to a structure (e.g., frame structure 240 of FIG. 3) forming at least a portion of the first surface 200A, the second surface 200B, and/or the third surface 200C.

The electronic device 200 according to an embodiment may include a substantially transparent front plate 202. In an embodiment, the front plate 202 may form at least a portion of the first surface 200A. In an embodiment, the front plate 202 may include, for example, a glass plate including various coating layers or a polymer plate, but the disclosure is not limited thereto.

The electronic device 200 according to an embodiment may include a substantially opaque rear plate 211. In an embodiment, the rear plate 211 may form at least a portion of the second surface 200B. In an embodiment, the rear plate 211 may be formed of coated or colored glass, ceramic, polymer, metal (e.g., aluminum, stainless steel (STS), or magnesium), or a combination of at least two of the materials.

The electronic device 200 according to an embodiment may include a side bezel structure (or side member) 218. In an embodiment, the side bezel structure 218 may be coupled to the front plate 202 and/or the rear plate 211 to form at least a portion of the third surface 200C of the electronic device 200. For example, the side bezel structure 218 may form the entirety of the third surface 200C of the electronic device 200, and as another example, the side bezel structure 218 may form the third surface 200C of the electronic device 200 together with the front plate 202 and/or the rear plate 211.

Unlike the illustrated embodiment, in the case that the third surface 200C of the electronic device 200 is partially formed by the front plate 202 and/or the rear plate 211, the front plate 202 and/or the rear plate 211 may include a region that seamlessly extends bending from its periphery toward the rear plate 211 and/or the front plate 202. The extended region of the front plate 202 and/or the rear plate 211 may be positioned, for example, at both ends of a long edge of the electronic device 200, but the disclosure is not limited to the above-described example.

In an embodiment, the side bezel structure 218 may include a metal and/or a polymer. In an embodiment, the rear plate 211 and the side bezel structure 218 may be integrally formed and may include the same material (e.g., a metal material such as aluminum), but the disclosure are not limited thereto. For example, the rear plate 211 and the side bezel structure 218 may be formed in separate configuration and/or may include different materials.

In an embodiment, the electronic device 200 may include at least one of a display 201, an audio module (203, 203, 207), a sensor module (not shown), a camera module (205, 212, 213), a key input device 217, a light emitting device (not shown), and/or a connector hole 208. In another embodiment, the electronic device 200 may omit at least one of these components (e.g., a key input device 217 or a light emitting device (not shown)), or may further include another component.

In an embodiment, the display 201 (e.g., a display module 160 of FIG. 1) may be visually exposed through a corresponding portion of the front plate 202 to the outside. For example, at least a portion of the display 201 may be visible through the front plate 202 forming the first surface 200A. In an embodiment, the display 201 may be disposed on the rear surface of the front plate 202.

In an embodiment, the appearance of the display 201 may be formed substantially the same as the appearance of the front plate 202 adjacent to the display 201. In an embodiment, in order to expand the area in which the display 201 is visually exposed, a distance between the outer periphery of the display 201 and the outer periphery of the front plate 202 may be formed to be generally the same.

In an embodiment, the display 201 (or the first surface 200A of the electronic device 200) may include a screen display area 201A. In an embodiment, the display 201 may provide visual information to a user through the screen display area 201A. In the embodiment illustrated, when the first surface 200A is viewed from the front, it is illustrated that the screen display area 201A is spaced apart from the outer periphery of the first surface 200A and is located inside the first surface 200A, but the disclosure is not limited thereto. In another embodiment, when the first surface 200A is viewed from the front, at least a portion of the periphery of the screen display area 201A may substantially coincide with the periphery of the first surface 200A (or the front plate 202).

In an embodiment, the screen display area 201A may include a sensing area 201B configured to obtain biometric information of a user. Here, the meaning of the phrase "the screen display area 201A including a sensing area 201B" may be understood to imply that at least a portion of the sensing area 201B may be overlapped on the screen display area 201A. For example, the sensing area 201B may refer to an area in which visual information may be displayed by the display 201, like other areas of the screen display area 201A, and additionally, biometric information (e.g., fingerprint) of a user may be obtained. In another embodiment, the sensing area 201B may be formed in the key input device 217.

In an embodiment, the display 201 may include an area in which a first camera module 205 (e.g., a camera module 180 of FIG. 1) is located. In an embodiment, an opening may be formed in the area of the display 201, and the first camera module 205 (e.g., a punch hole camera) may be at least partially disposed in the opening to face the first surface 200A. In such a circumstance, the screen display area 201A may be formed to surround at least a portion of the periphery of the opening. In another embodiment, the first camera module 205 (e.g., an under display camera (UDC)) may be disposed under the display 201 to overlap the area of the display 201. In such a case, the display 201 may provide visual information to the user through the area, and additionally, the first camera module 205 may obtain an image corresponding to a direction facing the first surface 200A through the area of the display 201.

In an embodiment, the display 201 may be coupled to or disposed adjacent to a touch sensing circuit, a pressure sensor capable of measuring an intensity (pressure) of touch, and/or a digitizer detecting a magnetic-field type of stylus pen.

In an embodiment, the audio modules (203, 204, 207) (e.g., an audio module 170 of FIG. 1) may include microphone holes 203 and 204, and a speaker hole 207.

In an embodiment, the microphone holes 203 and 204 may include a first microphone hole 203 formed in a partial area of the third surface 200C and a second microphone hole 204 formed in a partial area of the second surface 200B. A microphone (not shown) for obtaining sound from the outside may be disposed inside the microphone holes 203 and 204. The microphone may include a plurality of microphones to detect a direction of the sound.

In an embodiment, the second microphone hole 204 formed in a partial area of the second surface 200B may be disposed adjacent to the camera modules 205, 212 and 213. For example, the second microphone hole 204 may obtain sound according to operation of the camera modules 205, 212, and 213. However, the disclosure is not limited thereto.

In an embodiment, the speaker hole 207 may include an external speaker hole 207 and a receiver hole (not shown) for phone calling. The external speaker hole 207 may be formed on a portion of the third surface 200C of the electronic device 200. In another embodiment, the external speaker hole 207 may be implemented as a single hole together with the microphone hole 203. Although not illustrated, a receiver hole (not shown) for phone calling may be formed on another portion of the third surface 200C. For example, the receiver hole for phone calling may be formed on the opposite side of the external speaker hole 207 in the third surface 200C. For example, on the basis of the illustration of FIG. 2, the external speaker hole 207 may be formed on the third surface 200C corresponding to the lowermost end of the electronic device 200, and the receiver hole for phone calling may be formed on the third surface 200C corresponding to the uppermost end of the electronic device 200. However, the disclosure is not limited thereto, and in another embodiment, the receiver hole for phone calling may be formed in a position other than the third surface 200C. For example, the receiver hole for phone calling may be formed of a space spaced apart between the front plate 202 (or the display 201) and the side bezel structure 218.

In an embodiment, the electronic device 200 may include at least one speaker (not shown) configured to output audio sound to the outside of the housing through the external speaker hole 207 and/or the receiver hole (not shown) for phone calling.

In an embodiment, the sensor module (not shown) (e.g., a sensor module 176 of FIG. 1) may generate an electrical signal or a data value corresponding to an operating status within the electronic device 200 or an external environmental condition. For example, the sensor module may include at least one of a proximity sensor, an HRM sensor, a fingerprint sensor, a gesture sensor, a gyro sensor, a pressure sensor, a magnetic sensor, an acceleration sensor, a grip sensor, a color sensor, an infrared (IR) sensor, a biometric sensor, a temperature sensor, a humidity sensor, or an illumination sensor.

In an embodiment, the camera modules (205, 212, 213) (e.g., a camera module 180 of FIG. 1) may include a first camera module 205 disposed to face the first surface 200A of the electronic device 200, a second camera module 212 disposed to face the second surface 200B thereof, and a flash 213.

In an embodiment, the second camera module 212 may include a plurality of cameras (e.g., a dual camera, a triple camera, or a quad camera). However, the second camera module 212 is not limited to essentially including a plurality of cameras, and may include a single camera.

In an embodiment, the first camera module 205 and the second camera module 212 may include one or more lenses, an image sensor, and/or an image signal processor.

In an embodiment, the flash 213 may include, for example, a light emitting diode or a xenon lamp. In another embodiment, two or more lenses (an infrared camera, a wide-angle lens and a telephoto lens) and image sensors may be disposed on one surface of the electronic device 200.

In an embodiment, the key input device 217 (e.g., an input module 150 of FIG. 1) may be disposed on the third surface 200C of the electronic device 200. In another embodiment, the electronic device 200 may not include some or the entirety of the key input device 217, and the key input devices 217 not included therein may be implemented on the display 201 in another form such as a soft key.

In an embodiment, the connector hole 208 may be formed on the third surface 200C of the electronic device 200 so that a connector for an external device may be received therein. A connection terminal (e.g., a connection terminal 178 of FIG. 1) electrically connected to the connector of the external device may be disposed in the connector hole 208. The electronic device 200 according to an embodiment may include an interface module (e.g., an interface 177 of FIG. 1) for processing electrical signals transmitted/received via the connection terminal.

In an embodiment, the electronic device 200 may include a light emitting device (not shown). For example, the light emitting device (not shown) may be disposed on the first surface 200A of the housing. The light emitting device (not shown) may provide state information of the electronic device 200 in the form of light. In another embodiment, the light emitting device (not shown) may provide a light source in association with operation of the first camera module 205. For example, the light emitting device (not shown) may include an LED, an IR LED, and/or a xenon lamp.

Figure 3:
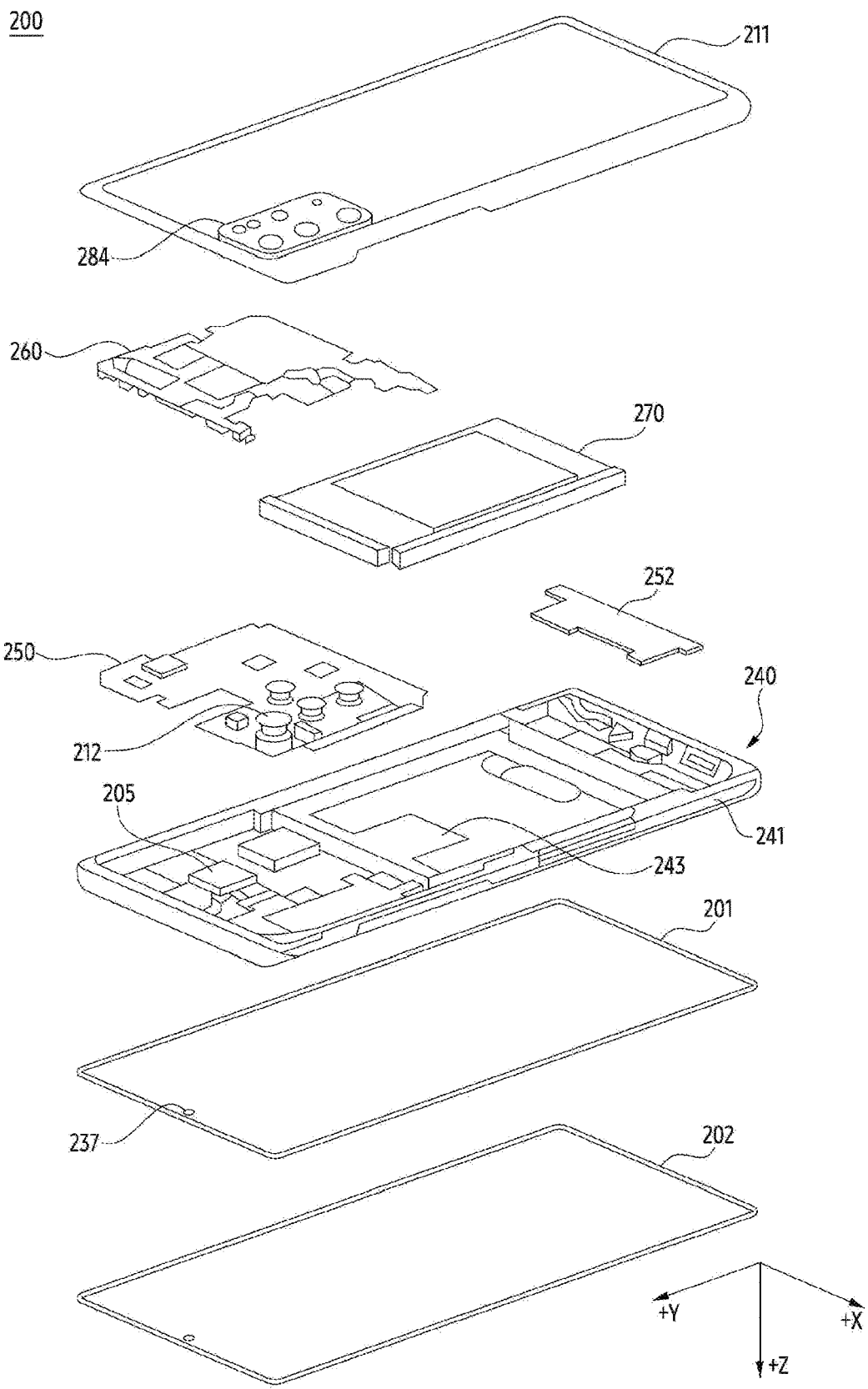
FIG. 3 is an exploded perspective view of an exemplary electronic device according to an embodiment.

FIG. 3 is an exploded perspective view of an example electronic device according to an embodiment.

Hereinafter, the description of configurations having the same reference numerals as those of the above-described configuration will be omitted for convenience of description and conciseness.

Referring to FIG. 3, the electronic device 200 according to an embodiment may include a frame structure 240, a first printed circuit board 250, a second printed circuit board 252, a cover plate 260, and a battery 270.

In an embodiment, the frame structure 240 may include a sidewall 241 forming an appearance (e.g., the third surface 200C of FIG. 2) of the electronic device 200 and a supporting portion 243 extending inward from the sidewall 241. In an embodiment, the frame structure 240 may be disposed between the display 201 and the rear plate 211. In an embodiment, the sidewall 241 of the frame structure 240 may surround a space between the rear plate 211 and the front plate 202 (and/or the display 201), and the supporting portion 243 of the frame structure 240 may extend from the sidewall 241 within the space.

In an embodiment, the frame structure 240 may support or accommodate other components included in the electronic device 200. For example, the display 201 is disposed on one surface of the frame structure 240 facing one direction (e.g., +z direction), and the display 201 may be supported by the supporting portion 243 of the frame structure 240. As another example, the first printed circuit board 250, the second printed circuit board 252, the battery 270, and the second camera module 212 are arranged on the other surface of the frame structure 240 facing an opposite direction (e.g., −z direction) to the one direction. The first printed circuit board 250, the second printed circuit board 252, the battery 270, and the second camera module 212 may be seated in a recess defined by the sidewall 241 of the frame structure 240 and/or the supporting portion 243, respectively.

In an embodiment, the first printed circuit board 250, the second printed circuit board 252, and the battery 270 may be coupled to the frame structure 240, respectively. For example, the first printed circuit board 250 and the second printed circuit board 252 may be fixedly disposed onto the frame structure 240 through a coupling member such as a screw. For example, the battery 270 may be fixedly disposed onto the frame structure 240 through an adhesive member (e.g., a double-sided tape). However, the disclosure is not limited to the above-described example.

In an embodiment, the cover plate 260 may be disposed between the first printed circuit board 250 and the rear plate 211. In an embodiment, the cover plate 260 may be disposed onto the first printed circuit board 250. For example, the cover plate 260 may be disposed onto a surface facing −z direction of the first printed circuit board 250.

In an embodiment, the cover plate 260 may at least partially overlap the first printed circuit board 250 with respect to z axis. In an embodiment, the cover plate 260 may cover at least a partial area of the first printed circuit board 250. With this configuration, the cover plate 260 may protect the first printed circuit board 250 from any physical impacts or may prevent a connector (e.g., a connector 234 of FIG. 3) coupled to the first printed circuit board 250 from separation.

In an embodiment, the cover plate 260 may be fixedly disposed onto the first printed circuit board 250 through a coupling member (e.g., a screw), or may be coupled to the frame structure 240 together with the first printed circuit board 250 through the coupling member.

In an embodiment, the display 201 may be disposed between the frame structure 240 and the front plate 202. For example, the front plate 202 may be disposed on one side (e.g., +z direction) of the display 201, and the frame structure 240 may be disposed on the other side (e.g., −z direction).

In an embodiment, the front plate 202 may be coupled to the display 201. For example, the front plate 202 and the display 201 may be bonded to each other, using an optics-used adhesive member (e.g., optically clear adhesive (OCA) or optically clear resin (OCR)) interposed therebetween.

In an embodiment, the front plate 202 may be coupled to the frame structure 240. For example, the front plate 202 may include an outer portion extending out of the display 201 when viewed in z-axis direction, and may be bonded to the frame structure 240 with an adhesive member (e.g., a double-sided tape) disposed between the outer portion of the front plate 202 and the frame structure 240 (e.g., the sidewall 241). However, the disclosure is not limited to the above-described example.

In an embodiment, a processor (e.g., the processor 120 of FIG. 1), a memory (e.g., the memory 130 of FIG. 1), and/or an interface (e.g., the interface 177 of FIG. 1) may be mounted onto the first printed circuit board 250 and/or the second printed circuit board 252. The processor may include, for example, one or more of a central processing unit, an application processor, a graphic processing unit, an image signal processor, a sensor hub processor, or a communication processor. The memory may include, for example, a volatile memory and/or a non-volatile memory. The interface may include, for example, a high-definition multimedia interface (HDMI), a universal serial bus (USB) interface, an SD card interface, and/or an audio interface. The interface may electrically or physically connect the electronic device 200 to an external electronic device and may include a USB connector, an SD card/MMC connector, or an audio connector. In an embodiment, the first printed circuit board 250 and the second printed circuit board 252 may be operatively or electrically connected to each other through a connection member (e.g., a flexible printed circuit board).

In an embodiment, the battery 270 (e.g., the battery 189 of FIG. 1) may supply power to at least one component of the electronic device 200. For example, the battery 270 may include a rechargeable secondary battery or a fuel cell. At least part of the battery 270 may be disposed on substantially the same plane as the first printed circuit board 250 and/or the second printed circuit board 252.

The electronic device 200 according to an embodiment may include an antenna module (not shown) (e.g., the antenna module 197 of FIG. 1). In an embodiment, the antenna module may be disposed between the rear plate 211 and the battery 270. The antenna module may include, for example, a near-field communication (NFC) antenna, a wireless charging antenna, and/or a magnetic secure transmission (MST) antenna. The antenna module may, for example, perform short-range communication with an external device or wirelessly transmit/receive electric power to/from the external device.

In an embodiment, the first camera module 205 (e.g., the front camera) may be disposed in at least a portion (e.g., the supporting portion 243) of the frame structure 240 such that its lens may receive external light through a partial area (e.g., a camera area 237) of the front plate 202 (e.g., the front surface 200A of FIG. 2).

In an embodiment, the second camera module 212 (e.g., a rear camera) may be disposed between the frame structure 240 and the rear plate 211. In an embodiment, the second camera module 212 may be electrically connected to the first printed circuit board 250 with a connection member (e.g., a connector). In an embodiment, the second camera module 212 may be disposed such that the lens may receive external light through the camera area 284 of the rear plate 211 of the electronic device 200.

In an embodiment, the camera area 284 may be formed on a surface (e.g., the rear surface 200B of FIG. 2) of the rear plate 211. In an embodiment, the camera area 284 may be formed to be at least partially transparent so that external light may be incident on the lens of the second camera module 212. In an embodiment, at least a portion of the camera area 284 may protrude from the surface of the rear plate 211 to a predetermined height. However, the disclosure is not limited thereto, and in another embodiment, the camera area 284 may form substantially the same plane as the surface of the rear plate 211.

In an embodiment, the housing of the electronic device 200 may refer to a configuration or a structure that forms at least a portion of the appearance of the electronic device 200. In this context, at least some of the front plate 202, the frame structure 240, and/or the rear plate 211 forming the exterior of the electronic device 200 may be referred to as a housing of the electronic device 200.

Figure 4:
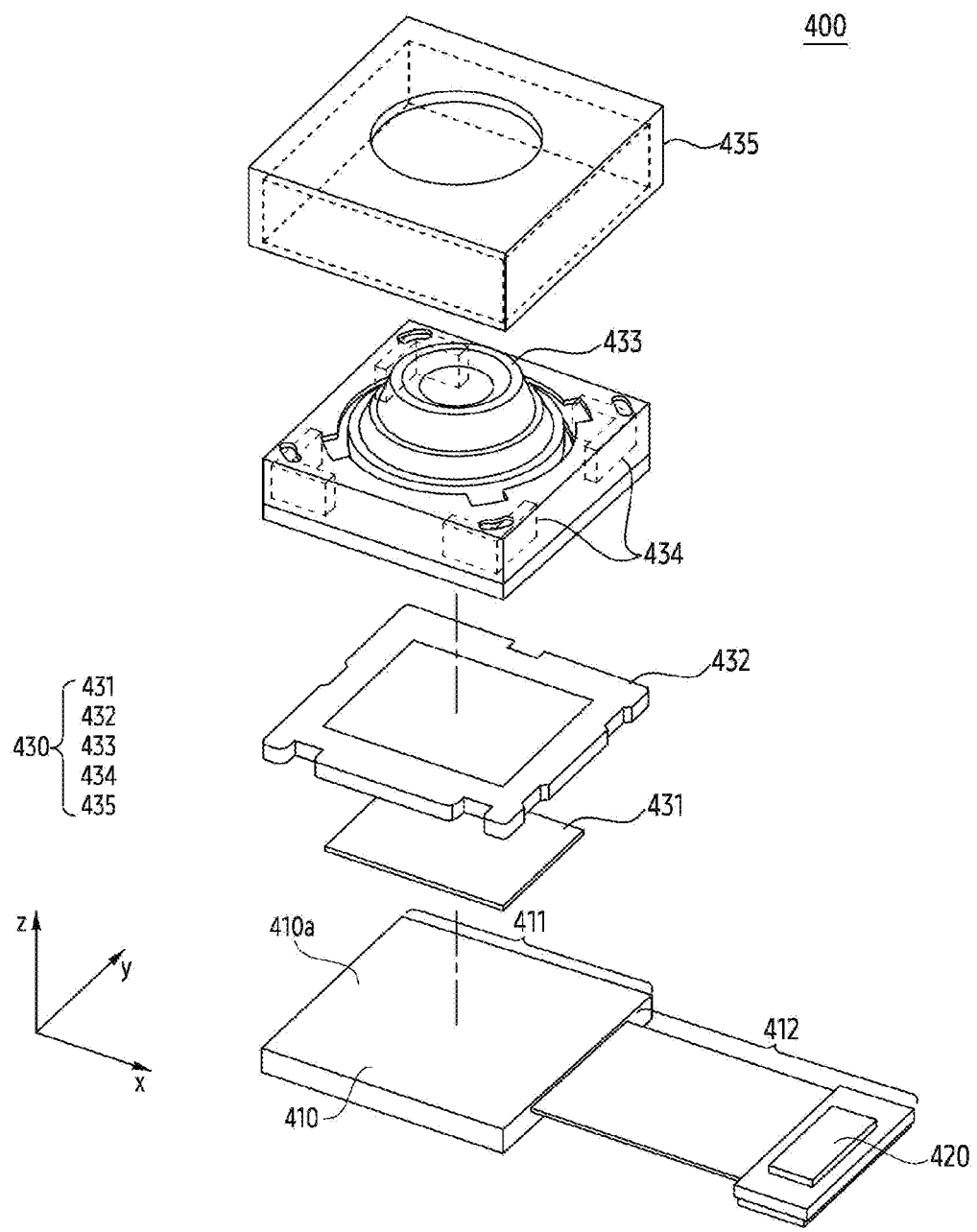
FIG. 4 is an exploded perspective view of an exemplary camera module according to an embodiment.

FIG. 4 is an exploded perspective view of an exemplary camera module according to an embodiment.

Referring to FIG. 4, a camera module 400 (e.g., a camera module 180 of FIG. 1) according to an embodiment may be configured to obtain an image based on receiving light from an object outside the electronic device. For example, the camera module 400 may include a plurality of camera modules having different optical characteristics. The plurality of camera modules may implement a dual camera, a 360 degree camera, and/or a spherical camera. However, it is not limited thereto, and the camera module 400 may include the plurality of camera modules having the same optical characteristics. According to an embodiment, the camera module 400 may include a printed circuit board 410, a connector 420, and/or a camera 430.

The printed circuit board 410 may form an electrical connection between components in the camera module 400. For example, the printed circuit board 410 may form an electrical connection between components in the camera 430. The printed circuit board 410 may form an electrical connection between the components in the camera module 400 and the external electronic components (e.g., a processor 120 of FIG. 1) of the camera module 400. According to an embodiment, the printed circuit board 410 may support components of the camera module 400. For example, the camera 430 may be disposed on one surface 410a of the printed circuit board 410.

According to an embodiment, the printed circuit board 410 may include a first region 411 and a second region 412. The first region 411 may support the camera 430. For example, as the first region 411 has rigidity, it may not be deformed by an external force. The second region 412 may be connected to the first region 411. The second region 412 may extend from the first region 411. The second region 412 may electrically connect the printed circuit board 410 and another electronic component. For example, the second region 412 may electrically connect the printed circuit board 410 and the connector 420. For example, the second region 412 may electrically connect the printed circuit board 410 and an electronic component disposed outside the camera module 400. For example, the second region 412 may be referred to as a cable for electrically connecting the printed circuit board 410 to another electronic component. According to an embodiment, at least a part of the second region 412 may have flexibility. As at least a part of the second region 412 has flexibility, the second region 412 may be deformable by the external force. For example, a part of the second region 412 may have flexibility, and another part of the second region 412 may have rigidity. Another part of the second region 412 having rigidity may support the connector 420. For example, the entire region of the second region 412 may have flexibility. According to an embodiment, the printed circuit board 410 including the first region 411 having rigidity and the second region 412, at least a part of which have flexibility may be referred to as a rigid flexible printed circuit board (RFPCB).

The connector 420 may electrically connect the camera module 400 and an electronic component outside the camera module 400. The connector 420 may electrically connect the printed circuit board 410 and another printed circuit board outside the camera module 400. For example, the connector 420 may have a shape corresponding to another connector disposed on a different printed circuit board and may be coupled to the other connector. For example, the connector 420 may be one of a socket connector and a plug connector of a board-to-board connector, but is not limited thereto. According to an embodiment, the connector 420 may be disposed on the printed circuit board 410. For example, the connector 420 may be disposed on the second region 412. The connector 420 may be spaced apart from the camera 430.

Camera 430 may obtain an image from an object outside camera module 400. According to an embodiment, the camera 430 may be disposed on the printed circuit board 410. For example, the camera 430 may be disposed on the first region 411 of the printed circuit board 410. According to an embodiment, the camera 430 may include an image sensor 431, an optical filter 432, a lens assembly 433, an actuator 434, and/or a cover member 435.

The image sensor 431 may obtain an electrical signal for image obtaining based on receiving light from the lens assembly 433. According to an embodiment, the image sensor 431 may be disposed on one surface 410a of the printed circuit board 410. For example, the image sensor 431 may include a charge coupled device (CCD) or a complementary metal oxide semiconductor (CMOS).

The optical filter 432 may selectively filter light having a specific wavelength. The light filtered by the optical filter 432 may be transmitted to the image sensor 431. For example, the optical filter 432 may be an infrared filter that filters infrared rays that cause color aberration and/or degradation in resolution, but is not limited thereto. According to an embodiment, the optical filter 432 may be disposed on the image sensor 431. For example, the optical filter 432 may be disposed between the image sensor 431 and the lens assembly 433.

The lens assembly 433 may collect light emitted from a subject outside the camera module 400. According to an embodiment, the lens assembly 433 may be movable with respect to the printed circuit board 410. For example, the lens assembly 433 may move along an optical axis direction (e.g., +z direction or −z direction) of the camera module 400. In case that the lens assembly 433 moves along the optical axis, the lens assembly 433 may move in a direction becoming closer to the one surface 410a of the printed circuit board 410 (e.g., −z direction) or away from the one surface 410a of the printed circuit board 410. For example, the lens assembly 433 may move along a direction perpendicular to the optical axis direction (e.g., +x direction, −x direction, +y direction, or −y direction) on the printed circuit board 410. In case that the lens assembly 433 moves along the direction perpendicular to the optical axis direction, the movement direction of the lens assembly 433 may be parallel to the first region 411 of the printed circuit board 410 on the one surface 410a of the printed circuit board 410.

The actuator 434 may provide a driving force to the lens assembly 433 so that the lens assembly 433 may be movable. According to an embodiment, the actuator 434 may move the lens assembly 433 in the optical axis direction of the camera module 400 for auto focusing. As the lens assembly 433 moves in the optical axis direction of the camera module 400, the distance between the lens assembly 433 and the image sensor 431 may change. The actuator 434 may adjust the focal length of the camera module 400 by changing the distance between the lens assembly 433 and the image sensor 431. For example, the actuator 434 may include at least one coil for providing the driving force to the lens assembly 433 and/or a magnet interacting with the at least one coil, but is not limited thereto.

The cover member 435 may protect components of the camera module 400. For example, the cover member 435 may define a part of the outer surface of the camera module 400. For example, the cover member 435 may shield electromagnetic waves penetrating into the camera module 400 or electromagnetic waves emitted from the actuator 434. The cover member 435 may be electrically connected to a ground layer in the printed circuit board 410 to shield electromagnetic waves transmitted to the camera module 400. The cover member 435 may include, for example, a metal material such as copper or aluminum, or a composite material in which a metal material and a filler (e.g., carbon fiber, carbon black, carbon nanotube (CNT), or Nickel coated graphite, which are polymeric materials) are mixed. For example, the cover member 435 may be referred to as a shield can, but is not limited thereto. According to an embodiment, the cover member 435 may be disposed on the one surface 410a of the printed circuit board 410. The cover member 435 may surround at least a part of the lens assembly 433.

For example, the electronic device (e.g., an electronic device 101 of FIG. 1 and/or an electronic device 200 of FIG. 2) may include the plurality of camera modules disposed in the electronic device. In order to secure the performance of the plurality of camera modules, the electronic device may include components for supporting the plurality of camera modules. In case that the types of components for supporting each of the plurality of camera modules are different, whenever the type of camera module 400 disposed in the electronic device changes, changes in the components for supporting each of the plurality of camera modules in the electronic device may be required. In case that the components for supporting each of the plurality of camera modules is changed, the manufacturing cost of the electronic device may increase because the cost is consumed by the change in the component for supporting the camera module 400. Hereinafter, a structure capable of supporting the plurality of camera modules to reduce the manufacturing cost of the electronic device will be described.

Figure 5A:
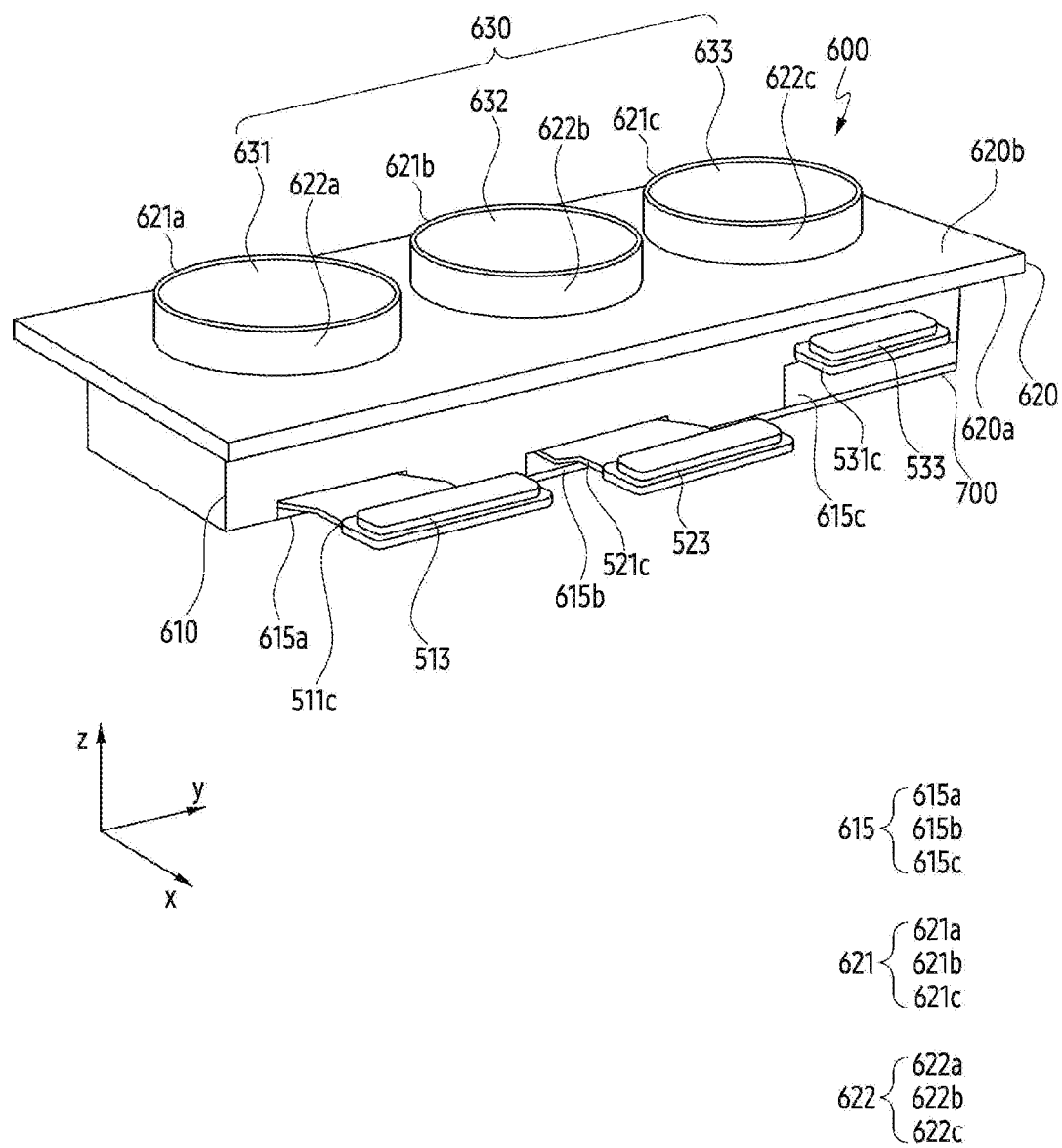
FIG. 5A is a perspective view of an exemplary camera module and a camera housing according to an embodiment.
Figure 5B:
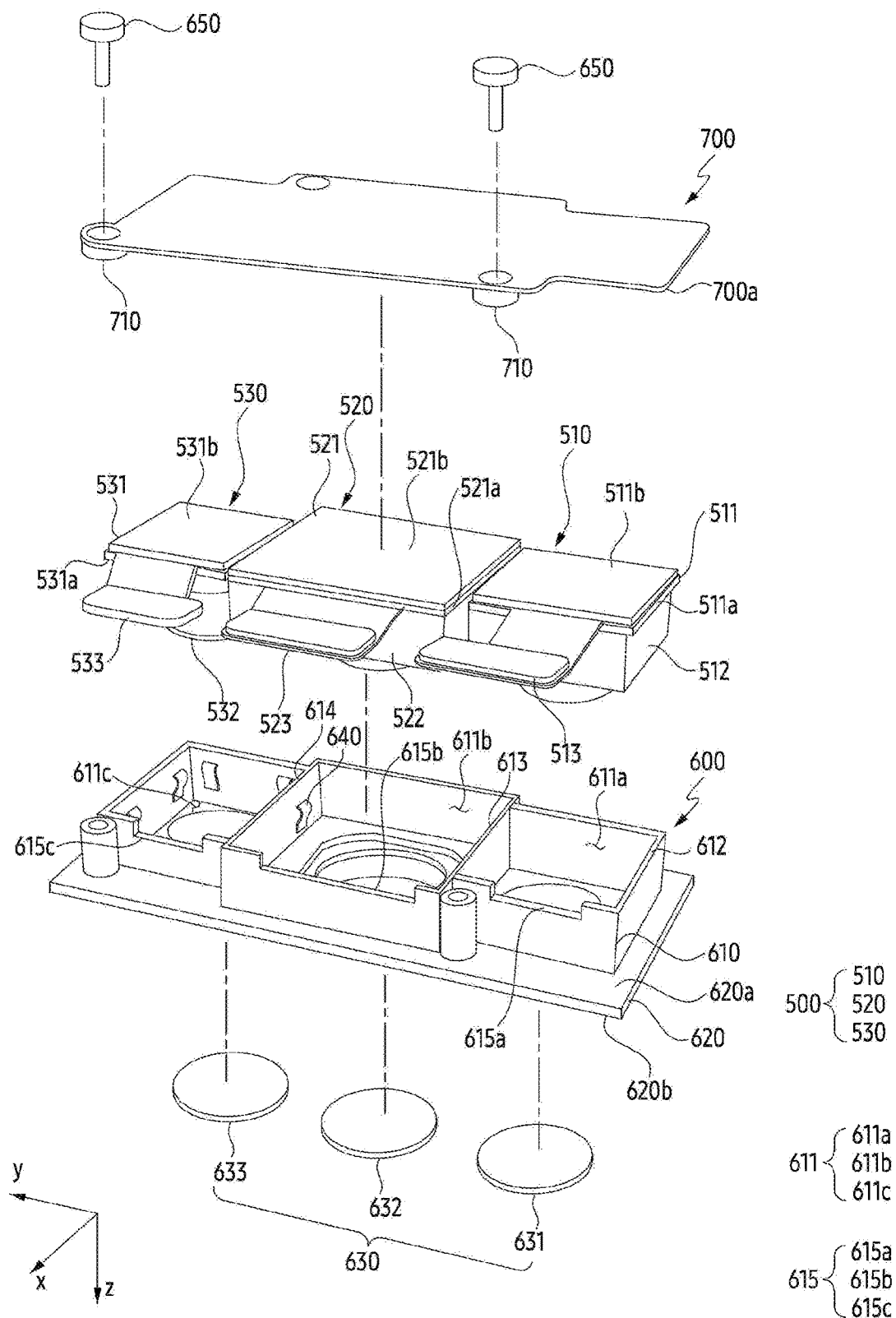
FIG. 5B is an exploded perspective view of an exemplary camera module and a camera housing according to an embodiment.

FIG. 5A is a perspective view of an exemplary camera module and a camera housing according to an embodiment, and FIG. 5B is an exploded perspective view of an exemplary camera module and a camera housing according to an embodiment.

Referring to FIGS. 5A and 5B, an electronic device (e.g., an electronic device 101 of FIG. 1 and/or an electronic device 200 of FIG. 2) according to an embodiment may include a plurality of camera modules 500, a camera housing 600, and/or a supporting plate 700.

The plurality of camera modules 500 may generate an image based on receiving light from the outside of the plurality of camera modules 500. According to an embodiment, the plurality of camera modules 500 may be spaced apart from each other in the camera housing 600. For example, the plurality of camera modules 500 may include a first camera module 510 (e.g., a camera module 400 of FIG. 4), a second camera module 520 (e.g., a camera module 400 of FIG. 4), and/or a third camera module 530 (e.g., a camera module 400 of FIG. 4) which are spaced apart from each other. Hereinafter, the number of the plurality of camera modules 500 is described as 3, but this is for convenience of description. For example, the number of a plurality of camera modules 500 may be 2 or 4 more.

The first camera module 510 may be accommodated in the camera housing 600. According to an embodiment, the first camera module 510 may include a first printed circuit board 511 (e.g., a printed circuit board 410 of FIG. 4), a first camera 512 (e.g., a camera 430 of FIG. 4 4) and/or a first connector 513 (e.g., a connector 420 of FIG. 4). The first printed circuit board 511 may support the first camera 512. For example, the first camera 512 may be disposed on one surface 511a of the first printed circuit board 511. For example, the first camera 512 may be in contact with one surface 511a of the first printed circuit board 511. The other surface 511b of the first printed circuit board 511 opposite to the one surface 511a of the first printed circuit board 511 may face the supporting plate 700. The direction (e.g., −z direction) in which the other surface 511b of the first printed circuit board 511 faces may be opposite to the direction (e.g., +z direction) in which one surface 511a of the first printed circuit board 511 faces. According to an embodiment, the first printed circuit board 511 may include a plurality of conductive layers disposed inside the first printed circuit board 511. For example, a part of the plurality of conductive layers may be referred to as a ground layer of the first printed circuit board 511. For example, another part of the plurality of conductive layers may provide a passage through which the power supplied to the first camera 512, the signal transmitted from the first camera 512 to the outside of the first camera module 510, or the signal transmitted from the outside of the first camera module 510 to the first camera 512 may move. The first connector 513 may electrically connect the first camera module 510 and an electronic component outside the first camera module 510. For example, the first connector 513 may electrically connect the first camera module 510 and electronic components outside the first camera module 510, as it is coupled to another connector outside the first camera module 510.

The second camera module 520 may be accommodated in the camera housing 600. According to an embodiment, the second camera module 520 may include a second printed circuit board 521 (e.g., the printed circuit board 410 of FIG. 4), a second camera 522 (e.g., the camera 430 of FIG. 4), and/or a second connector 523 (e.g., the connector 420 of FIG. 4). The second printed circuit board 521 may support the second camera 522. For example, the second camera 522 may be disposed on one surface 521a of the second printed circuit board 521. For example, the second camera 522 may be in contact with the one surface 521a of the second printed circuit board 521. The other surface 521b of the second printed circuit board 521 opposite to the one surface 521a of the second printed circuit board 521 may face the supporting plate 700. The direction (e.g., −z direction) in which the other surface 521b of the second printed circuit board 521 faces may be opposite to the direction (e.g., +z direction) in which the one surface 521a of the second printed circuit board 521 faces. According to an embodiment, the second printed circuit board 521 may include the plurality of conductive layers disposed inside the second printed circuit board 521. For example, a part of the plurality of conductive layers may be referred to as a ground layer of the second printed circuit board 521. For example, another part of the plurality of conductive layers may provide a passage through which the power supplied to the second camera 522, the signal transmitted from the second camera 522 to the outside of the second camera module 520, or the signal transmitted from the outside of the second camera module 520 to the second camera 522 may move. According to an embodiment, the second camera module 520 may be spaced apart from the first camera module 520 and/or the third camera module 530. For example, the second camera module 520 may be disposed between the first camera module 510 and the third camera module 530. The second connector 523 may electrically connect the second camera module 520 and electronic components outside the second camera module 520. For example, the second connector 523 may electrically connect the second camera module 520 and the electronic components outside the second camera module 520, as it is coupled to another connector outside the second camera module 520.

The third camera module 530 may be accommodated in the camera housing 600. According to an embodiment, the third camera module 530 may include a third printed circuit board 531 (e.g., the printed circuit board 410 of FIG. 4), a third camera 532 (e.g., the camera 430 of FIG. 4), and/or a third connector 533 (e.g., the connector 420 of FIG. 4). The third printed circuit board 531 may support the third camera 532. For example, the third camera 532 may be disposed on one surface 531a of the third printed circuit board 531. For example, the third camera 532 may be in contact with the one surface 531a of the third printed circuit board 531. The other surface 531b of the third printed circuit board 531 opposite to the one surface 531a of the third printed circuit board 531 may face the supporting plate 700. The direction (e.g., −z direction) in which the other surface 531b of the third printed circuit board 531 faces may be opposite to the direction (e.g., +z direction) in which one surface 531a of the third printed circuit board 531 faces. According to an embodiment, the third printed circuit board 531 may include the plurality of conductive layers disposed inside the third printed circuit board 531. For example, a part of the plurality of conductive layers may be referred to as a ground layer of the third printed circuit board 531. For example, another part of the plurality of conductive layers may provide a passage through which the power supplied to the third camera 532, the signal transmitted from the third camera 532 to the outside of the third camera module 530, or the signal transmitted from the outside of the third camera module 530 to the third camera 532 may move. The third connector 533 may electrically connect the third camera module 530 and electronic components outside the third camera module 530. For example, the third connector 533 may electrically connect the third camera module 530 and the electronic components outside the third camera module 530, as it is coupled to another connector outside the third camera module 530.

The camera housing 600 may protect a plurality of camera modules 500. For example, the camera housing 600 may protect the plurality of camera modules 500 from shocks transmitted to the plurality of camera modules 500. For example, the camera housing 600 may shield the plurality of camera modules 500, to reduce the generation of noise in the plurality of camera modules 500 or to reduce the generation of noise in other electronic components disposed adjacent to the plurality of camera modules 500. According to an embodiment, the camera housing 600 may accommodate the plurality of camera modules 500. For example, the camera housing 600 may surround the plurality of camera modules 500. The camera housing 600 may surround the plurality of camera modules 500. According to an embodiment, the camera housing 600 may include an accommodating part 610, a covering part 620, a plurality of windows 630, a supporting member 640, and/or at least one fastening member 650.

The accommodation part 610 may accommodate the plurality of camera modules 500. The accommodating part 610 may surround the first camera module 510, the second camera module 520, and/or the third camera module 530.

The accommodating part 610 may surround the first camera module 510, the second camera module 520, and/or the third camera module 530. According to an embodiment, the accommodating part 610 may be coupled to the supporting plate 700. For example, the accommodating part 610 may face one surface 700a of the supporting plate 700 facing the other surface 511b of the first printed circuit board 511 opposite to the one surface 511a of the first printed circuit board 511. According to an embodiment, the accommodating part 610 may have a shape extending from the supporting plate 700. For example, the accommodating part 610 may be perpendicular to the supporting plate 700. For example, the accommodating part 610 may extend in the direction (e.g., +z direction) perpendicular to the supporting plate 700. For example, the accommodating part 610 may extend in the direction (e.g., +z direction) in which the one surface 700a of the supporting plate 700 faces. For example, the accommodating part 610 may extend in the direction (e.g., +z direction) perpendicular to the one surface 511a of the first printed circuit board 511. According to an embodiment, the accommodating part 610 may include a plurality of pockets 611, an outer wall 612, a first barrier 613, a second barrier 614, and/or a plurality of notches 615.

Each of the plurality of pockets 611 may accommodate each of the plurality of camera modules 500. According to an embodiment, the plurality of pockets 611 may be surrounded by the outer wall 612 of the accommodating part 610. For example, the plurality of pockets 611 may mean an empty space disposed in the accommodating part 610 to accommodate the plurality of camera modules 500. For example, the plurality of pockets 611 may include a first pocket 611a for accommodating the first camera module 510, a second pocket 611b for accommodating the second camera module 520, and/or a third pocket 611c for accommodating the third camera module 530. According to an embodiment, each of the plurality of pockets 611 may have a shape corresponding to the shape of each of the first camera module 510, the second camera module 520, and/or the third camera module 530.

The outer wall 612 may surround the plurality of camera modules 500. For example, the outer wall 612 may surround the plurality of camera modules 500 from the outside of the plurality of camera modules 500. According to an embodiment, the outer wall 612 may surround the plurality of pockets 611 for accommodating the plurality of camera modules 500. For example, as the outer wall 612 surrounds the plurality of pockets 611, the outer wall 612 may define the outer surface of the accommodating part 610.

The first barrier 613 may partition the first pocket 611a in which the first camera module 510 is disposed and the second pocket 611b in which the second camera module 520 is disposed. According to an embodiment, the first barrier 613 may be disposed between the first camera module 510 and the second camera module 520. For example, the first barrier 613 may be disposed between the first pocket 611a and the second pocket 611b. According to an embodiment, the first barrier 613 may be connected to the outer wall 612 of the accommodating part 610. For example, the first barrier 613 may be connected to the outer wall 612 so as to be perpendicular to the outer wall 612.

The second barrier 614 may partition the second pocket 611b in which the second camera module 520 is disposed and the third pocket 611c in which the third camera module 530 is disposed. According to an embodiment, the second barrier 614 may be disposed between the second camera module 520 and the third camera module 530. According to an embodiment, the second barrier 614 may be connected to the outer wall 612 of the accommodating part 610. For example, the second barrier 614 may be connected to the outer wall 612 so as to be perpendicular to the outer wall 612. According to an embodiment, the second barrier 614 may be spaced apart from the first barrier 613.

Each of the plurality of notches 615 may provide a passage through which the plurality of printed circuit boards 511, 521, and 531 and the plurality of connectors 513, 523, and 533 may be connected. According to an embodiment, the plurality of notches 615 may penetrate the accommodating part 610. For example, the plurality of notches 615 may penetrate the outer wall 612 of the accommodating part 610. According to an embodiment, the plurality of notches 615 may include a first notch 615a, a second notch 615b, and/or a third notch 615c. A part 511c of the first printed circuit board 511 may extend to the outside of the camera housing 600 as it passes through the first notch 615a. The part 511c of the first printed circuit board 511 may be connected to the first connector 513 disposed outside the camera housing 600 as it extends to the outside of the camera housing 600. A part 521c of the second printed circuit board 521 may extend to the outside of the camera housing 600 as it passes through the second notch 615b. The part 521c of the second printed circuit board 521 may be connected to the second connector 523 disposed outside the camera housing 600 as it extends to the outside of the camera housing 600. A part 531c of the third printed circuit board 531 may extend to the outside of the camera housing 600 as it passes through the third notch 615c. The part 531c of the third printed circuit board 531 may be connected to the third connector 533 disposed outside the camera housing 600 as it extends to the outside of the camera housing 600.

The covering part 620 may cover the plurality of camera modules 500. For example, the covering part 620 may cover the first camera module 510, the second camera module 520, and/or the third camera module 530. According to an embodiment, the covering part 620 may be disposed on the accommodating part 610. The covering part 620 may be connected to the accommodating part 610. For example, one surface 620a of the covering part 620 may be connected to the accommodating part 610. According to an embodiment, the covering part 620 may be parallel to the supporting plate 700. For example, the covering part 620 may extend in a direction parallel to the one surface 700a of the supporting plate 700. For example, the covering part 620 may extend in a direction parallel to the one surface 511a of the first printed circuit board 511. As the covering part 620 extends in a direction parallel to the supporting plate 700, the one surface 620a of the covering part 620 may be parallel to the one surface 700a of the supporting plate 700. The one surface 620a of the covering part 620 may face the one surface 700a of the supporting plate 700. According to an embodiment, the accommodating part 610 may be covered by the covering part 620 when the camera housing 600 is viewed from above (e.g., −z direction). When the camera housing 600 is viewed in the direction (e.g., −z direction) in which the other surface 511b of the first printed circuit board 511 faces, the accommodating part 610 may be covered by the covering part 620. For example, when the camera housing 600 is viewed from above, the size of the accommodating part 610 may be smaller than the size of the covering part 620. As the accommodating part 610 is smaller than the covering part 620, the covering part 620 may cover the accommodating part 610. According to an embodiment, the covering part 620 may be integrally formed with the accommodating part 610. For example, as the accommodating part 610 for covering the plurality of camera modules 500 and the covering part 620 for covering the plurality of camera modules 500 are integrally formed, compared to a case in which the accommodating part 610 and the covering part 620 are manufactured with different components, the manufacturing cost of the camera housing 600 may be reduced. According to an embodiment, the accommodating part 610 and the covering part 620 may include a conductive material. As the accommodating part 610 for covering the plurality of camera modules 500 and the covering part 620 for covering the plurality of camera modules 500 are made of the conductive material, the plurality of camera modules 500 may be shielded by accommodating part 610 and the covering part 620. For example, the accommodating part 610 and the covering part 620 may be electrically connected to at least one of the ground layer of the first printed circuit board 511, the ground layer of the second printed circuit board 521, and the ground layer of the third printed circuit board 531. As the plurality of camera modules 500 are shielded by the accommodating part 610 and the covering part 620, generation of noise in the plurality of camera modules 500 may be reduced. According to an embodiment, the covering part 620 may include a plurality of openings 621 and/or a plurality of protruding parts 622.

Each of the plurality of openings 621 may correspond to each of the plurality of camera modules 500. For example, the plurality of openings 621 may penetrate the covering part 620. According to an embodiment, the plurality of openings 621 may include a first opening 621a, a second opening 621b, and/or a third opening 621c. The first opening 621a may correspond to the first camera 512 of the first camera module 510. For example, the first opening 621a may be disposed on the first camera 512. For example, the first opening 621a may correspond to the lens assembly (e.g., the lens assembly 433 of FIG. 4) of the first camera 512. The second opening 621b may correspond to the second camera 522 of the second camera module 520. For example, the second opening 621b may be disposed on the second camera 522. For example, the second opening 621b may correspond to the lens assembly (e.g., the lens assembly 422 of FIG. 4) of the second camera 522. The third opening 621c may correspond to the third camera 532 of the third camera module 530. For example, the third opening 621c may be disposed on the third camera 532. For example, the third opening 621c may correspond to the lens assembly (e.g., the lens assembly 422 of FIG. 4) of the third camera 532.

The plurality of protruding parts 622 may surround the plurality of openings 621. According to an embodiment, the plurality of protruding parts 622 may protrude from the other surface 620b of the covering part 620 opposite to the one surface 620a of the covering part 620. For example, each of the plurality of protruding parts 622 may extend from the other surface 620b of the covering part 620 along a direction (e.g., +z direction) in which the other surface 620b of the covering part 620 faces. According to an embodiment, the plurality of protruding parts 622 may include a first protruding part 622a, a second protruding part 622b, and/or a third protruding part 622c. The first protruding part 622a may cover the first opening 621a. For example, the first protruding part 622a may cover an edge of the first opening 621a. According to an embodiment, the first protruding part 622a may surround a part of the first camera 512. For example, the first protruding part 622a may surround a part of the lens assembly of the first camera 512. The second protruding part 622b may cover the second opening 621b. For example, the second protruding part 622b may cover an edge of the second opening 621b. According to an embodiment, the second protruding part 622b may accommodate a part of the second camera 522. For example, the second protruding part 622b may surround a part of the lens assembly of the second camera 522. The third protruding part 622c may cover the third opening 621c. For example, the third protruding part 622c may cover an edge of the third opening 621c. According to an embodiment, the third protruding part 622c may surround a part of the third camera 532. For example, the third protruding part 622c may surround a part of the lens assembly of the third camera 532.

The plurality of windows 630 may transmit light transmitted from the outside of the plurality of camera modules 500 to the plurality of camera modules 500. For example, the plurality of windows 630 may be made of substantially transparent or translucent material. According to an embodiment, the plurality of windows 630 may be coupled to the covering part 620. For example, the plurality of windows 630 may be supported by the plurality of protruding parts 622. For example, the plurality of windows 630 may be covered by the plurality of protruding parts 622. According to an embodiment, the plurality of windows 630 may include a first window 631, a second window 632, and/or a third window 633. The first window 631 may be disposed on the first opening 621a. For example, the first window 631 may cover the first opening 621a. The second window 632 may be disposed on the second opening 621b. For example, the second window 632 may cover the second opening 621b. The third window 633 may be disposed on the third opening 621c. For example, the third window 633 may cover the third opening 621c.

The supporting member 640 may support the plurality of camera modules 500 such that positions of the plurality of camera modules 500 are maintained in the accommodating part 610. According to an embodiment, the supporting member 640 may be disposed in the accommodating part 610 so as to be in contact with the first camera module 510, the second camera module 520, and/or the third camera module 530. For example, the supporting member 640 may be in contact with the accommodating part 610. According to an embodiment, the supporting member 640 may be deformable. For example, the supporting member 640 may be deformable by contact with at least one of the first camera module 510, the second camera module 520, and the third camera module 530.

According to an embodiment, the supporting member 640 may electrically connect the accommodating part 610 and the ground layers of the plurality of camera modules 500. For example, the supporting member 640 may include the conductive material. For example, the supporting member 640 may be referred to as a c-clip. The supporting member 640 may be electrically connected to the accommodating part 610 in contact with the supporting member 640 as it includes the conductive material. The supporting member 640 may be electrically connected to the covering part 620 connected to the accommodating part 610 as it includes the conductive material. As the supporting member 640 is electrically connected to the accommodating part 610 and the covering part 620, the ground layers in the printed circuit boards 511, 521, and 531 of the plurality of camera modules 500 may be electrically connected to the accommodating part 610 and the covering part 620 by the supporting member 640 contacting the plurality of camera modules 500. As the ground layers in the printed circuit boards 511, 521, and 531 of the plurality of camera modules 500 are electrically connected to the accommodating part 610 and the covering part 620, the generation of noise from the plurality of camera modules 500 may be reduced. However, it is not limited thereto, and the supporting member 640 may be made of a non-conductive material (e.g., rubber). In case that the supporting member 640 is made of the non-conductive material, the ground layers in the printed circuit boards 511, 521, and 531 of the plurality of camera modules 500 may be electrically connected to the accommodating part 610 and the covering part 620 through a conductive member (not illustrated) disposed in the accommodating part 610. The conductive member may have, for example, the form of a tape including the conductive material, but is not limited thereto.

At least one fastening member 650 may couple the camera housing 600 and the supporting plate 700. The at least one fastening member 650 may penetrate the supporting plate 700 and the camera housing 600. For example, the at least one fastening member 650 may penetrate the supporting plate 700 and the accommodating part 610. For example, the at least one fastening member 650 may be referred to as a screw, but is not limited thereto.

The supporting plate 700 may be coupled to the camera housing 600. For example, the supporting plate 700 may include at least one fastening hole 710 penetrating the supporting plate 700. As the at least one fastening member 650 is coupled into the at least one fastening hole 710, the supporting plate 700 and the camera housing 600 may be coupled to each other. According to an embodiment, the supporting plate 700 may cover the plurality of camera modules 500. For example, the supporting plate 700 may be coupled to the camera housing 600 to be disposed on the other surface 511b of the first printed circuit board 511, the other surface 521b of the second printed circuit board 521, and the other surface 531b of the third printed circuit board 531. For example, the one surface 700a of the supporting plate 700 may face the other surface 511b of the first printed circuit board 511, the other surface 521b of the second printed circuit board 521, and the other surface 531b of the third printed circuit board 531. According to an embodiment, the supporting plate 700 may be in contact with the accommodating part 610. The supporting plate 700 may cover the plurality of pockets 611 as it is in contact with the accommodating part 610. According to an embodiment, the supporting plate 700 may be parallel to the covering part 620. For example, the supporting plate 700 may extend in a direction parallel to one surface 620a of the covering part 620. According to an embodiment, when the camera housing 600 is viewed from above (e.g., −z direction), the size of the supporting plate 700 may correspond to the size of the accommodating part 610. When the camera housing 600 is viewed from above, the size of the supporting plate 700 may be smaller than the size of the covering part 620.

According to an embodiment, the supporting plate 700 may include the conductive material. For example, the conductive material of the supporting plate 700 may be electrically connected to the ground layer exposed to at least one of the other surface 511b of the first printed circuit board 511, the other surface 521b of the second printed circuit board 521, and the other surface 531b of the third printed circuit board 531. For example, the conductive material of the supporting plate 700 may be electrically connected to the accommodating part 610 and the covering part 620 as it contacts the accommodating part 610 made of the conductive material. By the accommodating part 610 accommodating the plurality of camera modules 500, the covering part 620 covering the plurality of camera modules 500, and the supporting plate 700 in contact with the accommodating part 610, the plurality of camera modules 500 may be shielded. As the plurality of camera modules 500 are shielded, the generation of noise in the plurality of camera modules 500 may be reduced.

As described above, the electronic device according to an embodiment may provide a structure in which the manufacturing cost of the camera housing 600 may be reduced because the accommodating part 610 and the covering part 620 of the camera housing 600 are integrally formed. The electronic device according to an embodiment may provide the structure capable of reducing the generation of noise in the plurality of camera modules 500 because the accommodating part 610 and the covering part 620 include the conductive material to shield the plurality of camera modules 500. The electronic device according to an embodiment may provide the structure capable of reducing the generation of noise in the plurality of camera modules 500 because the supporting plate 700 coupled to the camera housing 600 includes the conductive material.

Figure 6:
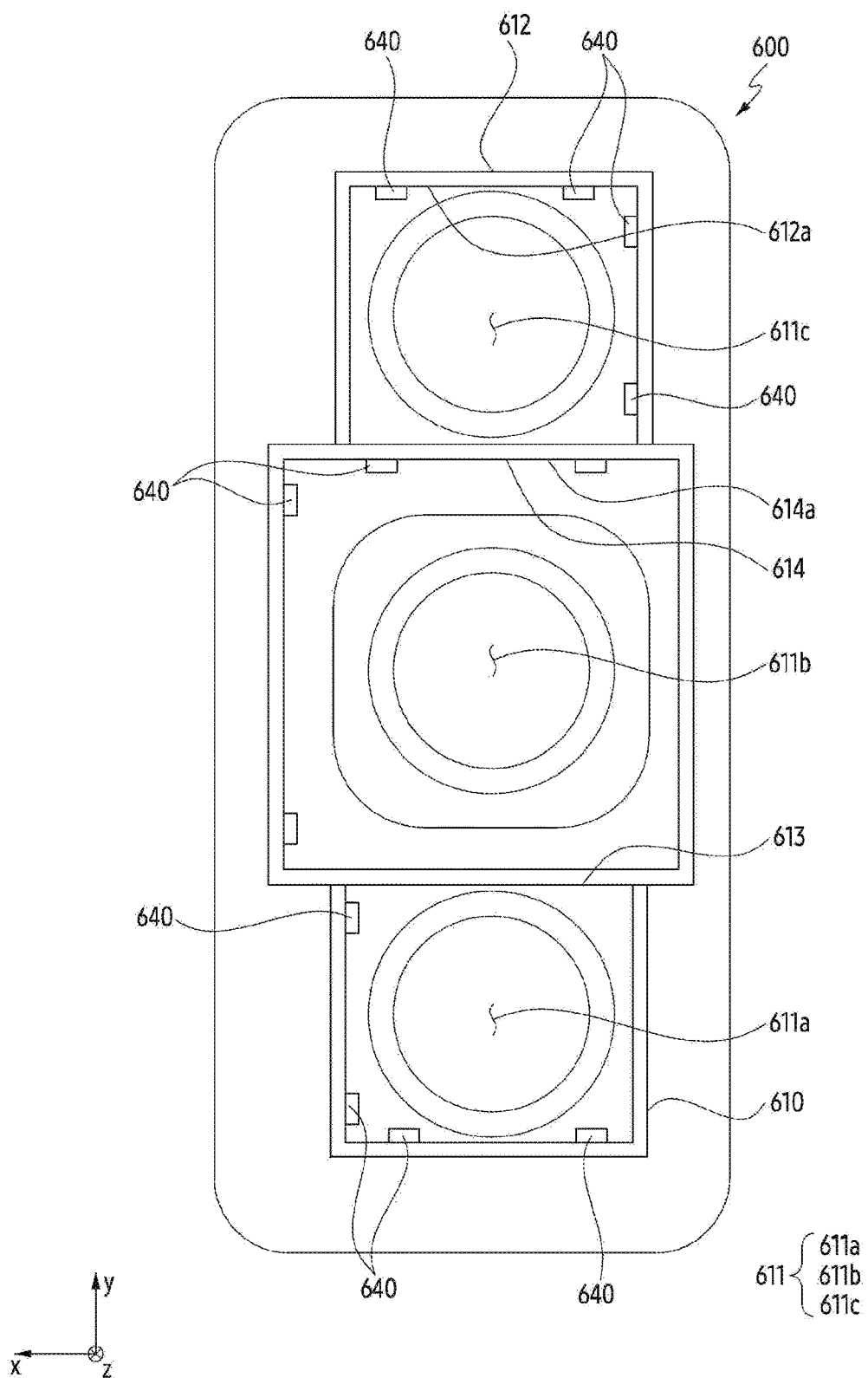
FIG. 6 is a rear view of an accommodating part of an exemplary camera housing according to an embodiment.

FIG. 6 is a rear view of an accommodating part of an exemplary camera housing according to an embodiment.

Referring to FIG. 6, according to an embodiment, a supporting member 640 may include a plurality of supporting members spaced apart from each other. The plurality of supporting members may be disposed in a plurality of pockets 611 of the accommodating part 610. For example, the plurality of supporting members may be disposed inside each of a first pocket 611a, a second pocket 611b, and a third pocket 611c.

According to an embodiment, the supporting member 640 may be disposed on the inner surface 612a of an outer wall 612 of the accommodating part 610. The inner surface 612a of the outer wall 612 may mean one surface of the outer wall 612 surrounding the plurality of pockets 611.

According to an embodiment, the supporting member 640 may be disposed on at least one of a first barrier 613 and a second barrier 614 of the accommodating part 610. For example, the supporting member 640 may be disposed on one surface 614a of the second barrier 614 facing the second pocket 611b. However, it is not limited thereto, and the supporting member 640 may be disposed on one surface of the first barrier 613 of the accommodating part 610.

As described above, the electronic device according to an embodiment may provide a structure capable of supporting a plurality of camera modules (e.g., a plurality of camera modules 500 of FIG. 5A and FIG. 5B) by the supporting member 640 disposed inside the plurality of pockets 611. As the plurality of camera modules 500 are supported by the supporting member 640, performance of the plurality of camera modules 500 may be secured. Meanwhile, although the number of supporting members 640 is shown as plural in FIG. 6, it is not limited thereto. For example, the number of support members 640 may be one.

Figure 7:
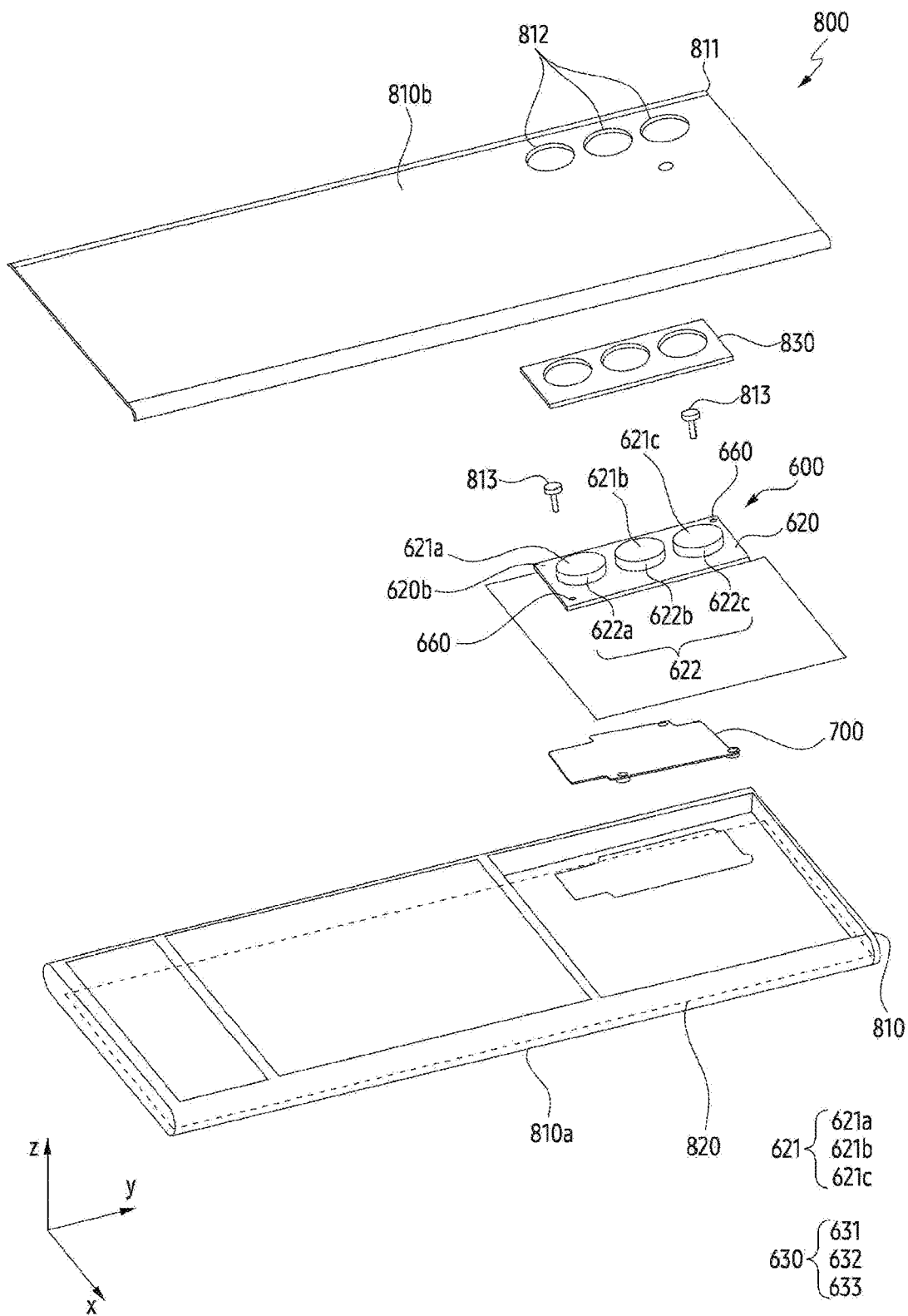
FIG. 7 is an exploded perspective view of an exemplary electronic device according to an embodiment.

FIG. 7 is an exploded perspective view of an exemplary electronic device according to an embodiment.

Referring to FIG. 7, an electronic device 800 according to an embodiment may include a camera housing 600, a supporting plate 700, a housing 810, a display 820, and/or an adhesive member 830.

According to an embodiment, the camera housing 600 may include at least one coupling hole 660. The at least one coupling hole 660 may penetrate the camera housing 600. For example, the at least one coupling hole 660 may penetrate a covering part 620 of the camera housing 600.

The housing 810 may define at least a part of the outer surface of the electronic device 800. The housing 810 may provide a space in which components of the electronic device 800 may be disposed. For example, the camera housing 600 may be disposed inside the housing 810. For example, the supporting plate 700 may be disposed inside the housing 810. The housing 810 may support the components of the electronic device 800. For example, a first surface 810a of the housing 810 may support the display 820. According to an embodiment, the housing 810 may include a covering plate 811, a plurality of camera holes 812, and/or a coupling member 813.

The covering plate 811 may provide a part of the outer surface of the electronic device 800. The covering plate 811 may be exposed to the outside of the electronic device 800. For example, the covering plate 811 may define a second surface 810b of the housing 810 opposite to the first surface 810a of the housing 810. A direction (e.g., +z direction) the second surface 810b faces may be opposite to a direction (e.g., −z direction) the first surface 810a faces. According to an embodiment, the covering plate 811 may be disposed on the camera housing 600. For example, the covering plate 811 may be disposed on the other surface 620b of the covering part 620. For example, the covering plate 811 may cover the camera housing 600.

The plurality of camera holes 812 may correspond to a plurality of openings 621. For example, each of the plurality of camera holes 812 may correspond to a first opening 621a, a second opening 621b, and a third opening 621c. For example, when the camera housing 600 is viewed from above (e.g., −z direction), the first opening 621a may overlap one camera hole among the plurality of camera holes 812. For example, when the camera housing 600 is viewed from above (e.g., −z direction), the second opening 621b may overlap another camera hole among the plurality of camera holes 812. For example, when the camera housing 600 is viewed from above (e.g., −z direction), the third opening 621c may overlap the other camera hole among the plurality of camera holes 812.

The coupling member 813 may couple the camera housing 600 and the housing 810. For example, the coupling member 813 may penetrate the camera housing 600 through at least one coupling hole 660. As the coupling member 813 is inserted into at least one coupling hole 660, the camera housing 600 and the housing 810 may be coupled to each other.

The display 820 may be configured to provide visual information. For example, the display 820 may be configured to emit light for providing the visual information in a direction (e.g., −z direction) in which the first surface 810a of the housing 810 faces. According to an embodiment, the display 820 may be disposed on the housing 810. For example, the display 820 may be disposed on the first surface 810a.

The adhesive member 830 may reduce the inflow of foreign substances through a gap between the covering plate 811 and the camera housing 600. For example, the adhesive member 830 may include a waterproof tape including an adhesive material. The adhesive member 830 may be disposed between the camera housing 600 and the second surface 810b of the housing 810. For example, the adhesive member 830 may be disposed between the covering plate 811 and the camera housing 600.

According to an embodiment, a part of the camera housing 600 may be exposed to the outside of the housing 810. Another part of the camera housing 600 may be covered by the housing 810. For example, a plurality of protruding parts 622 of the camera housing 600 may be exposed to the outside of the housing 810. For example, a first protruding part 622a, a second protruding part 622b, and a third protruding part 622c may be exposed to the outside of the housing 810. As the plurality of protruding parts 622 are exposed to the outside of the housing 810, the plurality of openings 621 covered by each of the plurality of protruding parts 622 may be exposed to the outside of the housing 810. For example, the first opening 621a may be exposed to the outside of the housing 810 through the second surface 810b. For example, the second opening 621b may be exposed to the outside of the housing 810 through the second surface 810b. For example, the third opening 621c may be exposed to the outside of the housing 810 through the second surface 810b.

According to an embodiment, the covering part 620 of the camera housing 600 may face the covering plate 811. For example, the other surface 620b of the cover part 620 may face the second surface 810b of the housing 810.

According to an embodiment, a part of the housing 810 may include a conductive material. For example, the part of the housing 810 may be made of the conductive material. The part of the housing 810 including the conductive material may serve as an electrical ground. According to an embodiment, the camera housing 600 may be electrically connected to the housing 810. For example, as the camera housing 600 contacts the housing 810, the conductive material of the camera housing 600 may be electrically connected to the conductive material of the camera housing 810. As the camera housing 600 accommodating a plurality of camera modules (e.g., the plurality of camera modules 500 of FIG. 5B) is electrically connected to the housing 810, the generation of noise in the plurality of camera modules 500 may be reduced. According to an embodiment, the supporting plate 700 may be electrically connected to the housing 810. For example, as the supporting plate 700 and the housing 810 contact each other, the conductive material of the supporting plate 700 may be electrically connected to the conductive material of the housing 810. As the supporting plate 700 covering the plurality of camera modules 500 is electrically connected to the housing 810, the generation of noise in the plurality of camera modules 500 may be reduced.

As described above, the electronic device 800 according to an embodiment may provide a structure capable of stably supporting the plurality of camera modules 500 by the camera housing 600 accommodating the plurality of camera modules 500 in the housing 810. In the electronic device 800 according to an embodiment, since the camera housing 600 covering the plurality of camera modules 500 is electrically connected to the housing 810, the generation of noise generated in the plurality of camera modules 500 may be reduced. In the electronic device 800 according to an embodiment, since the supporting plate 700 covering the plurality of camera modules 500 is electrically connected to the housing 810, the generation of noise generated in the plurality of camera modules 500 may be reduced.

In case that the plurality of camera modules are not supported in the electronic device, performance of the plurality of camera modules may be reduced because the plurality of camera modules may be misaligned. In order to reduce performance degradation of the plurality of camera modules, components for supporting each of the plurality of camera modules may be disposed in the electronic device. In case that the components for supporting the plurality of camera modules are different from each other, whenever a part of the plurality of camera modules are changed, the components for supporting the plurality of camera modules need to be newly manufactured. The electronic device may need a structure capable of supporting the plurality of camera modules while reducing the cost for manufacturing the plurality of camera modules.

An electronic device (e.g., an electronic device 800 of FIG. 7) according to an embodiment may comprise a housing (e.g., a housing 810 of FIG. 7). According to an embodiment, the electronic device may comprise a first camera module (e.g., a first camera module 510 of FIG. 5B) including a first printed circuit board (e.g., a first printed circuit board 511 of FIG. 5B) and the first camera (e.g., a first camera 512 of FIG. 5B) disposed on one surface (e.g., one surface 511*a* of FIG. 5B) of the first printed circuit board. According to an embodiment, the electronic device may comprise a second camera module (e.g., a second camera module 520 of FIG. 5B) including a second printed circuit board (e.g., a second printed circuit board 521 of FIG. 5B) and the second camera (e.g., a second camera 522 of FIG. 5B) disposed on one surface (e.g., one surface 521*a* of FIG. 5B) of the second printed circuit board. According to an embodiment, the electronic device may comprise a camera housing (e.g., a camera housing 600 of FIGS. 5A and 5B) disposed in the housing and accommodating the first camera module and the second camera module. According to an embodiment, the electronic device may comprise a supporting plate (e.g., a supporting plate 700 of FIGS. 5A and 5B) coupled to the camera housing to be disposed on the other surface (e.g., the other surface 511*b* of FIG. 5B) of the first printed circuit board and the other surface (e.g., the other surface 521*b* of FIG. 5B) of the second printed circuit board. According to an embodiment, the camera housing may include an accommodating part (e.g., an accommodating part 610 of FIGS. 5A and 5B) including a first barrier (e.g., a first barrier 613 of FIG. 5B) disposed between the first camera module and the second camera module and extending along a direction perpendicular to the supporting plate to surround the first camera module and the second camera module. According to an embodiment, the camera housing may include a covering part (e.g., a covering part 620 of FIGS. 5A and 5B) including a first opening (e.g., a first opening 621*a* of FIGS. 5A and 5B) corresponding the first camera and exposed to outside of the housing and a second opening (e.g., a second opening 621*b* of FIGS. 5A and 5B) corresponding the second camera and exposed to outside of the housing, and covering the first camera module and the second camera module by extending along a direction parallel to the supporting plate. According to an embodiment, the camera housing may include a supporting member (e.g., a supporting member 640 of FIG. 5B) disposed in the accommodating part to be in contact with at least one of the first camera module and the second camera module. According to an embodiment, the accommodating part is integrally formed with the covering part.

The electronic device according to an embodiment may provide a structure in which the manufacturing cost of a structure for supporting a plurality of camera modules is reduced since the accommodating part and the covering part of the camera housing are integrally manufactured. An electronic device according to an embodiment may provide a structure capable of reducing departure from a position where a plurality of camera modules are designed by a supporting member disposed in the camera housing.

According to an embodiment, the accommodating part may be covered by the covering part when the camera housing is viewed in a direction the other surface of the first printed circuit board faces.

The electronic device according to an embodiment may provide a structure in which the covering part covering the accommodating part is integrally formed with the accommodating part.

According to an embodiment, the covering part may include a plurality of protruding parts including a first protruding part (e.g., a first protruding part 622*a* of FIG. 5A and FIG. 5B) covering the first opening and a second protruding part (e.g., a second protruding part 622*b* of FIG. 5B) covering the second opening and may include a plurality of protrusions (e.g., a plurality of protrusions 622 of FIG. 5*b*) protruding from the other surface (e.g., the other surface 620*b* of FIG. 5B) of the covering part opposite to the one surface (e.g., one surface 620*a* of FIG. 5B) of the covering part connected to the accommodating part.

The electronic device according to an embodiment may provide a structure in which a plurality of protruding parts and a plurality of accommodating parts are integrally formed to accommodate some of a plurality of cameras.

According to an embodiment, the camera housing may further include a coupling hole (e.g., a coupling hole 660 of FIG. 7) penetrating the camera housing. According to an embodiment, the housing may further include a coupling member (e.g., a coupling member 813 of FIG. 7) penetrating the coupling hole to couple the camera housing to the housing.

The electronic device according to an embodiment may provide a structure in which the camera housing may be supported within the housing by a camera housing and a coupling member penetrating the housing.

According to an embodiment, the electronic device may include a display (e.g., a display 820 of FIG. 7) disposed on a first surface (e.g., a first surface 810*a* of FIG. 7) of the housing. According to an embodiment, the other surface of the covering part opposite to the one surface of the covering part connected to the accommodating part may face a second surface (e.g., a second surface 810*b* of FIG. 8) of the housing opposite to the first surface of the housing.

According to an embodiment, the housing may include a covering plate (e.g., a covering plate 811 of FIG. 7) including a plurality of camera holes (e.g., a plurality of camera holes 812 of FIG. 7) corresponding to the first opening and the second opening, defining the second surface, and covering the camera housing.

According to an embodiment, the supporting plate may include a fastening hole (e.g., a fastening hole 710 of FIG. 5B) penetrating the supporting plate. According to an embodiment, the camera housing may include a fastening member (e.g., a fastening member 650 of FIG. 5B) penetrating the fastening hole to couple the supporting plate to the camera housing.

An electronic device according to an embodiment may provide a structure surrounding a plurality of camera modules to shield the plurality of camera modules by a fastening member coupling the supporting plate and the camera housing.

According to an embodiment, the accommodating part and the covering part may include conductive material configured to shield the first camera module and the second camera module.

An electronic device according to an embodiment may provide a structure capable of reducing generation of noise in a plurality of camera modules by the accommodating part and the covering part including a conductive material.

According to an embodiment, the supporting plate may include conductive material configured to shield the first camera module and the second camera module.

An electronic device according to an embodiment may provide a structure capable of reducing the generation of noise within a plurality of camera modules by the supporting plate including the conductive material.

According to an embodiment, the supporting member may include conductive material electrically connected to the covering part and the accommodating part.

An electronic device according to an embodiment may provide a structure capable of reducing the generation of noise within a plurality of camera modules by the supporting member including the conductive material.

According to an embodiment, the conductive material may be electrically connected to the housing.

The electronic device according to an embodiment may provide a structure capable of reducing the generation of noise within a plurality of camera modules since the camera housing and the housing are electrically connected to each other.

According to an embodiment, the conductive material may be electrically connected to at least one of a ground layer in the first printed circuit board and a ground layer in the second printed circuit board.

The electronic device according to an embodiment may provide a structure capable of reducing the generation of noise within a plurality of camera modules since the camera housing is connected to the ground layers in a plurality of printed circuit boards.

According to an embodiment, the supporting member may be deformable by contact with at least one of the first camera module and the second camera module.

The electronic device according to an embodiment may provide a structure capable of supporting a plurality of camera modules by a deformable supporting member.

According to an embodiment, the camera housing may include a plurality of windows (e.g., a plurality of windows 630 of FIGS. 5A and 5B) including a first window (e.g., a first window 631 of FIGS. 5A and 5B) disposed on the first opening and a second window (e.g., a second window 632 of FIGS. 5A and 5B) disposed on the second opening and configured to transmit light transmitted from outside of the housing.

An electronic device according to an embodiment may obtain an image through a plurality of camera modules because a plurality of windows configured to transmit light are coupled to the covering part.

According to an embodiment, the electronic device may include a third camera module including a third printed circuit board (e.g., a third printed circuit board 531 of FIG. 5B) and a third camera (e.g., a third camera 532 of FIG. 5B) disposed on one surface of the third printed circuit board, and may include a third camera module (e.g., a third camera module 530 of FIG. 5B) accommodated in the camera housing. According to an embodiment, the supporting plate may be disposed on the other surface of the third printed circuit board. According to an embodiment, the accommodating part may further include a second barrier (e.g., a second barrier 614 of FIG. 5B) disposed between the second camera module and the third camera module and may surround the third camera module. According to an embodiment, the covering part may further include a third opening (e.g., a third opening 621c of FIGS. 5A and 5B) corresponding to the third camera and may cover the third camera module.

An electronic device according to an embodiment may provide a structure capable of supporting a plurality of camera modules by a camera housing accommodating the third camera module.

An electronic device (e.g., an electronic device 800 of FIG. 7) according to an embodiment may comprise a display (e.g., a display 820 of FIG. 8). According to an embodiment, the electronic device may comprise a housing (e.g., a housing 810 of FIG. 7) including a first surface (e.g., a first surface 810a of FIG. 7) supporting the display and a second surface (e.g., a second surface 810b of FIG. 7) opposite to the first surface. According to an embodiment, the electronic device may comprise a first camera module (e.g., a first camera module 510 of FIG. 5B) including a first printed circuit board (e.g., a first printed circuit board 511 of FIG. 5B) and the first camera (e.g., a first camera 512 of FIG. 5B) disposed on one surface (e.g., one surface 511a of FIG. 5B) of the first printed circuit board. According to an embodiment, the electronic device may comprise a second camera module (e.g., a second camera module 520 of FIG. 5B) including a second printed circuit board (e.g., a second printed circuit board 521 of FIG. 5B) and the second camera (e.g., the second camera 522 of FIG. 5B) disposed on one surface (e.g., one surface 521a of FIG. 5B) of the second printed circuit board. According to an embodiment, the electronic device may comprise a camera housing (e.g., a camera housing 600 of FIGS. 5A and 5B) disposed in the housing and accommodating the first camera module and the second camera module. According to an embodiment, the electronic device may comprise a supporting plate (e.g., a supporting plate 700 of FIGS. 5A and 5B) coupled to the camera housing to be disposed on the other surface (e.g., the other surface 511b of FIG. 5B) of the first printed circuit board and the other surface (e.g., the other surface 521b of FIG. 5B) of the second printed circuit board. According to an embodiment, the camera housing may include an accommodating part (e.g., an accommodating part 610 of FIGS. 5A and 5B) including a first barrier (e.g., a first barrier 613 of FIG. 5B) disposed between the first camera module and the second camera module and extending along a direction perpendicular to the one surface of the first printed circuit board to surround the first camera module and the second camera module. According to an embodiment, the camera housing may include a covering part (e.g., a covering part 620 of FIGS. 5A and 5B) including a first opening (e.g., a first opening 621a of FIGS. 5A and 5B) exposed to outside of the housing corresponding to the first camera and a second opening (e.g., a second opening 621b of FIGS. 5A and 5B) exposed to the outside of the housing corresponding to the second camera, and covering the first camera module and the second camera module by extending along a direction parallel to one surface of the first printed circuit board. According to an embodiment, the camera housing may include a supporting member (e.g., a supporting member 640 of FIG. 5B) disposed in the accommodating part to be in contact with at least one of the first camera module and the second camera module. According to an embodiment, the covering part may be integrally formed with the accommodating part and may include conductive material configured to shield the first camera module and the second camera module.

The electronic device according to an embodiment may provide a structure in which the manufacturing cost of a structure for supporting a plurality of camera modules is reduced since the accommodating part and the covering part of the camera housing are integrally manufactured. An electronic device according to an embodiment may provide a structure capable of reducing departure from a position where a plurality of camera modules are designed by a supporting member disposed in the camera housing.

According to an embodiment, the covering part may include a plurality of protruding parts including a first protruding part (e.g., a first protruding part 622a of FIGS. 5A and 5B) covering the first opening and a second protruding part (e.g., a second protruding part 622b of FIG. 5B)

covering the second opening and may include a plurality of protrusions (e.g., a plurality of protrusions 622 of FIG. 5B) protruding from the other surface (e.g., the other surface 620b of FIG. 5B) of the covering part opposite to the one surface (e.g., one surface 620a of FIG. 5B) of the covering part connected to the accommodating part.

The electronic device according to an embodiment may provide a structure in which a plurality of protruding parts and a plurality of accommodating parts are integrally formed to accommodate some of a plurality of cameras.

According to an embodiment, the camera housing may further include a coupling hole (e.g., a coupling hole 660 of FIG. 7) penetrating the camera housing. According to an embodiment, the housing may further include a coupling member (e.g., a coupling member 813 of FIG. 7) penetrating the coupling hole to couple the camera housing to the housing.

The electronic device according to an embodiment may provide a structure in which the camera housing may be supported within the housing by a camera housing and a coupling member penetrating the housing.

According to an embodiment, the supporting plate may include a fastening hole (e.g., a fastening hole 710 of FIG. 5B) penetrating the supporting plate. According to an embodiment, the camera housing may include a fastening member (e.g., a fastening member 650 of FIG. 5B) penetrating the fastening hole to couple the supporting plate to the camera housing.

An electronic device according to an embodiment may provide a structure surrounding a plurality of camera modules to shield the plurality of camera modules by a fastening member coupling the supporting plate and the camera housing.

According to an embodiment, the supporting plate includes a conductive material configured to shield the first camera module and the second camera module.

According to an embodiment, the supporting plate is configured to reduce generation of noise by the first camera module and the second camera module.

According to an embodiment, the electronic device including a structure surrounding the first camera module and the second camera module to shield the first camera module and the second camera module by a fastening member coupling the supporting plate and the camera housing.

The electronic device according to various embodiments disclosed in the present document may be various types of devices. The electronic device may include, for example, a portable communication device (e.g., a smartphone), a computer device, a portable multimedia device, a portable medical device, a camera, a wearable device, or a home appliance. The electronic device according to an embodiment of the present document is not limited to the above-described devices.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this document, each of the phrases such as "A or B", "at least one of A and B", "at least one of A, B and C", "at least one of A, B, or C", and "at least one of A, B, or C" may include any one of the phrases together, or all possible combinations thereof. Terms such as "first", "second", or "second", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used in various embodiments of the present document may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

Various embodiments of the present document may be implemented as software (e.g., a program) including one or more instructions stored in a storage medium (or external memory) readable by a device (e.g., wearable device 100). For example, a processor (e.g., a processor) of a device (e.g., wearable device 100) may call and execute at least one of the one or more instructions stored from a storage medium. This makes it possible for the device to operate to perform at least one function according to at least one command called. The one or more instructions may include code generated by a compiler or code that may be executed by an interpreter. The device-readable storage medium may be provided in the form of a non-transitory storage medium. Here, the term 'non-transitory' only means that a storage medium is a device that is tangible and does not include a signal (e.g., electromagnetic wave), and the term does not distinguish between a case where data is semi-permanently stored and a case where it is temporarily stored.

According to an embodiment, a method according to various embodiments disclosed in the present document may be provided by being included in a computer program product. The computer program products may be traded between sellers and buyers as products. The computer program products may be distributed in the form of device-readable storage media (e.g., compact disc read only memory (CD-ROM), or distributed (e.g., downloaded or uploaded) directly or online through an application store (e.g., Play Store™) or between two user devices (e.g., smartphones). In the case of online distribution, at least some of the computer program products may be temporarily stored or temporarily created on a device-readable storage medium such as a manufacturer's server, a server in an application store, or a memory in a relay server.

According to various embodiments, each of the above-described components (e.g., a module or a program) may include a single object or a plurality of objects, and some of the plurality of objects may be separated and disposed in other components. According to various embodiments, one or more components or operations of the above-described corresponding components may be omitted, or one or more other components or operations may be added. Alternatively, or additionally, a plurality of components (e.g., modules or programs) may be integrated into one component. In this case, the integrated component may perform one or more functions of each of the components in the same or similar manner as those performed by the corresponding component among the plurality of components before the integration.

According to various embodiments, operations performed by a module, a program, or other components may be executed sequentially, in parallel, repeatedly, or heuristic, performed in a different order, omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a first camera module comprising a first printed circuit board and the first camera disposed on one surface of the first printed circuit board;
   a second camera module comprising a second printed circuit board and the second camera disposed on one surface of the second printed circuit board;
   a camera housing disposed in the housing and accommodating the first camera module and the second camera module; and
   a supporting plate coupled to the camera housing to face the other surface of the first printed circuit board and the other surface of the second printed circuit board,
   wherein the camera housing comprises:
      an accommodating part comprising a first barrier disposed between the first camera module and the second camera module and extending along a direction perpendicular to the supporting plate to surround the first camera module and the second camera module,
      a covering part comprising a first opening corresponding the first camera and exposed to outside of the housing and a second opening corresponding the second camera and exposed to outside of the housing, the covering part covers the first camera module and the second camera module by extending along a direction parallel to the supporting plate, and
      a supporting member disposed in the accommodating part to be in contact with at least one of the first camera module and the second camera module, and
      wherein the accommodating part is integrally formed with the covering part.

2. The electronic device of claim 1, wherein the accommodating part is covered by the covering part when the camera housing is viewed in a direction the other surface of the first printed circuit board faces.

3. The electronic device of claim 1,
   wherein one surface of the covering part is connected to the accommodating part, and
   wherein the covering part further comprises a plurality of protruding parts including a first protruding part covering the first opening and a second protruding part covering the second opening and protruding from the other surface of the covering part opposite to the one surface of the covering part.

4. The electronic device of claim 1,
   wherein the camera housing further comprises a coupling hole penetrating the camera housing, and
   wherein the housing further comprises a coupling member penetrating the coupling hole to couple the camera housing to the housing.

5. The electronic device of claim 1,
   wherein the electronic device further includes a display disposed on a first surface of the housing,
   wherein one surface of the covering part is connected to the accommodating part, and
   wherein the other surface of the covering part opposite to the one surface of the covering part faces a second surface of the housing opposite to the first surface of the housing.

6. The electronic device of claim 5, wherein the housing further includes a covering plate including a plurality of camera holes respectively corresponding to the first opening and the second opening, defining the second surface, and covering the camera housing.

7. The electronic device of claim 1,
   wherein the supporting plate comprises a fastening hole penetrating the supporting plate, and
   wherein the camera housing further comprises a fastening member penetrating the fastening hole to couple the supporting plate to the camera housing.

8. The electronic device of claim 1, wherein the accommodating part and the covering part further comprises conductive material configured to shield the first camera module and the second camera module.

9. The electronic device of claim 1, wherein the supporting plate further comprises conductive material configured to shield the first camera module and the second camera module.

10. The electronic device of claim 1, wherein the supporting member comprises conductive material electrically connected to the covering part and the accommodating part.

11. The electronic device of claim 10, wherein the conductive material electrically connected to the housing.

12. The electronic device of claim 11, wherein the conductive material electrically connected to at least one of at least one of a ground layer of the first printed circuit board and a ground layer of the second printed circuit board.

13. The electronic device of claim 1, wherein the supporting member is deformable by contact between at least one of the first camera module and the second camera module.

14. The electronic device of claim 1, wherein the camera housing further comprises a plurality of windows including a first window disposed on the first opening and a second window disposed on the second opening and configured to transmit light transmitted from outside of the housing.

15. The electronic device of claim 1,
   wherein the electronic device further comprises a third camera module including a third printed circuit board and a third camera disposed one surface of the third printed circuit board, and accommodated in the camera housing,
   wherein the supporting plate disposed on the other surface of the third printed circuit board,
   wherein the accommodating part further comprises a second barrier disposed between the second camera module and the third camera module and surrounding the third camera module, and
   wherein the covering part further comprises a third opening corresponding to the third camera and covering the third camera module.

16. An electronic device comprising:
   a display;
   a housing comprising a first surface supporting the display and a second surface opposite to the first surface;
   a first camera module comprising a first printed circuit board and the first camera disposed on one surface of the first printed circuit board;

a second camera module comprising a second printed circuit board and the second camera disposed on one surface of the second printed circuit board;

a camera housing disposed in the housing and accommodating the first camera module and the second camera module; and a supporting plate coupled to the camera housing to face the other surface of the first printed circuit board and the other surface of the second printed circuit board, wherein the camera housing comprises:

an accommodating part comprising a first barrier disposed between the first camera module and the second camera module and extending along a direction perpendicular to the one surface of the first printed circuit board to surround the first camera module and the second camera module, a covering part comprising a first opening exposed to outside of the housing through the second surface and a second opening exposed to the outside of the housing through the second surface the covering part covers the first camera module and the second camera module by extending along a direction parallel to one surface of the first printed circuit board, and a supporting member disposed in the accommodating part to be in contact with at least one of the first camera module and the second camera module, and wherein the accommodating part is integrally formed with the covering part and comprises conductive material configured to shield the first camera module and the second camera module.

17. The electronic device of claim 16, wherein the accommodating part is covered by the covering part when the camera housing is viewed in a direction the other surface of the printed circuit board faces.

18. The electronic device of claim 16, wherein one surface of the covering part is connected to the accommodating part, and wherein the covering part further comprises a plurality of protruding parts including a first protruding part covering the first opening and a second protruding part covering the second opening and protruding from the other surface of the covering part opposite to the one surface of the covering part.

19. The electronic device of claim 16, wherein the camera housing further comprises a coupling hole penetrating the camera housing, and wherein the housing further comprises a coupling member penetrating the coupling hole to couple the camera housing to the housing.

20. The electronic device of claim 16, wherein the supporting plate comprises a fastening hole penetrating the supporting plate, and wherein the camera housing further comprises a fastening member penetrating the fastening hole to couple the supporting plate to the camera housing.

\* \* \* \* \*